United States Patent
Smolin et al.

(10) Patent No.: US 11,870,663 B1
(45) Date of Patent: Jan. 9, 2024

(54) AUTOMATED REGRESSION INVESTIGATOR

(71) Applicant: Tableau Software, LLC, Seattle, WA (US)

(72) Inventors: David Alexander Smolin, Sammamish, WA (US); Yury Alekseyevich Bogucharov, Bellevue, WA (US); Lizette Garcia Cruz, Woodinville, WA (US); Clark Reid Hodder, Bellevue, WA (US); Nickolai Medveditskov, Kenmore, WA (US); Akiva Michael Tuttle Notkin, Seattle, WA (US); Andrew Christopher Tanner, Burien, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/880,561

(22) Filed: Aug. 3, 2022

(51) Int. Cl.
*H04L 41/50* (2022.01)
*H04L 41/082* (2022.01)

(52) U.S. Cl.
CPC ........ *H04L 41/5032* (2013.01); *H04L 41/082* (2013.01)

(58) Field of Classification Search
CPC .......................... H04L 41/5032; H04L 41/082
USPC ........................................................ 709/224
See application file for complete search history.

(56) References Cited

U.S. PATENT DOCUMENTS

| | | | |
|---|---|---|---|
| 9,665,437 B2 * | 5/2017 | Bhargava | G06F 11/1446 |
| 10,270,668 B1 * | 4/2019 | Thompson | H04L 41/16 |
| 10,305,758 B1 * | 5/2019 | Bhide | G06F 11/3409 |
| 10,425,442 B2 * | 9/2019 | Luger | H04L 63/308 |
| 10,630,546 B2 * | 4/2020 | Baxa | H04L 41/0893 |
| 10,680,889 B2 * | 6/2020 | Vasseur | G06N 20/10 |
| 10,747,520 B2 * | 8/2020 | Shepard | G06Q 10/06 |
| 10,785,105 B1 * | 9/2020 | Rathinasabapathy | G06F 11/1433 |
| 10,833,942 B2 * | 11/2020 | Apostolopoulos | H04L 67/561 |
| 10,833,951 B2 * | 11/2020 | Do | H04L 67/10 |
| 10,868,711 B2 * | 12/2020 | Chor | H04L 41/14 |
| 10,985,970 B1 * | 4/2021 | Goyal | G06F 16/2477 |
| 11,023,511 B1 * | 6/2021 | Fletcher | G06F 16/338 |
| 11,062,016 B2 * | 7/2021 | Kerai | G06F 21/6227 |
| 11,150,972 B1 * | 10/2021 | Cheruiyot | G06F 11/0793 |
| 11,263,229 B1 * | 3/2022 | Basavaiah | G06F 16/2477 |
| 11,296,955 B1 * | 4/2022 | Fletcher | G06F 3/0482 |

(Continued)

*Primary Examiner* — Melvin H Pollack
(74) *Attorney, Agent, or Firm* — Morgan, Lewis & Bockius LLP

(57) ABSTRACT

Embodiments are directed to automated investigation of regression or other defects. A time-series of values for a metric associated with an execution of a verification action for a service may be provided. If a metric value in the time-series of values is outside of a control range, further actions may be performed, including: determining a last valid version of the service based on the time-series of values; determining a first invalid version of the service based on the time-series of values; determining changes associated with differences between the last valid version of the service and the first invalid version of the service based on the time-series of values; determining responsible users based on the determined changes; and generating a defect report based on the changes and the metric value that is outside of the control range such that the responsible users are associated with the defect report.

20 Claims, 16 Drawing Sheets

(56) References Cited

U.S. PATENT DOCUMENTS

| | | | |
|---|---|---|---|
| 11,316,941 B1* | 4/2022 | Jain | H04L 41/0816 |
| 11,409,516 B2* | 8/2022 | Kolar | H04L 43/045 |
| 11,496,353 B2* | 11/2022 | Chandrasekhar | H04L 41/142 |
| 11,567,756 B2* | 1/2023 | Nicolae | H04L 41/0631 |
| 11,599,280 B2* | 3/2023 | Faibish | G06N 3/08 |
| 11,615,358 B2* | 3/2023 | Tabak | G06F 11/3409 709/224 |
| 11,616,682 B2* | 3/2023 | Thampy | H04L 43/0823 709/224 |
| 11,620,528 B2* | 4/2023 | Ryan | G06N 3/045 709/224 |
| 11,621,899 B1* | 4/2023 | Bettaiah | G06F 16/24573 709/224 |
| 11,627,033 B2* | 4/2023 | Umakanth | H04L 43/0823 709/224 |
| 11,627,034 B1* | 4/2023 | Chawathe | H04L 41/0631 709/224 |
| 11,641,314 B2* | 5/2023 | Singer | H04L 41/5016 709/224 |
| 11,641,319 B2* | 5/2023 | Richards | H04L 43/14 709/224 |
| 11,652,682 B2* | 5/2023 | Yano | G16Y 20/10 709/224 |
| 2016/0182333 A1* | 6/2016 | Ranjekar | H04L 41/5009 709/224 |
| 2019/0149396 A1* | 5/2019 | Zafer | H04L 41/0654 709/224 |
| 2021/0266781 A1* | 8/2021 | Alkurd | H04W 72/54 |
| 2021/0271681 A1* | 9/2021 | Jayaram | G06Q 20/027 |
| 2022/0004863 A1* | 1/2022 | Park | G16H 50/20 |
| 2022/0353153 A1* | 11/2022 | Costante | G06N 20/00 |
| 2023/0011452 A1* | 1/2023 | Barber | H04L 41/0631 |
| 2023/0120313 A1* | 4/2023 | Agarwal | H04L 43/08 709/224 |
| 2023/0126260 A1* | 4/2023 | Elsakhawy | H04L 41/16 709/224 |
| 2023/0164029 A1* | 5/2023 | Mermoud | H04L 41/0823 709/220 |
| 2023/0164045 A1* | 5/2023 | Vasseur | H04L 43/08 709/224 |

* cited by examiner

Fig. 13

AUTOMATED REGRESSION INVESTIGATOR

The present invention relates generally to quality management services or applications, and more particularly, but not exclusively, to verifying performance and operation of services.

BACKGROUND

Contemporary computing services or applications may have many complex or critical features that require verification or testing to ensure that they function as required. Accordingly, as features or feature complexity increase, verifying performance and operations of services may require increased effort. In some cases, a linear growth in features may result in exponential increases in effort or resources. In some cases, the complexity of contemporary computing services may increase the difficulty of identifying various types of defects. Also, in some large or complex services or applications, it may be difficult to determine changes (e.g., code changes, configuration changes, or the like) that may be correlated with specific defects or diminished performance. Further, it may be important to determine the personnel, teams, or the like, that may be responsible for introducing the changes that may be correlated with the defect. However, in some cases, for some services it may be difficult determine the specific changes that led to a defect which may make it difficult to assign the defect to the appropriate personnel for further investigation or correction. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 13 illustrates a representation of defect a report for automated regression investigator in accordance with one or more of the various embodiments;

DETAILED DESCRIPTION OF VARIOUS EMBODIMENTS

Figure 1:
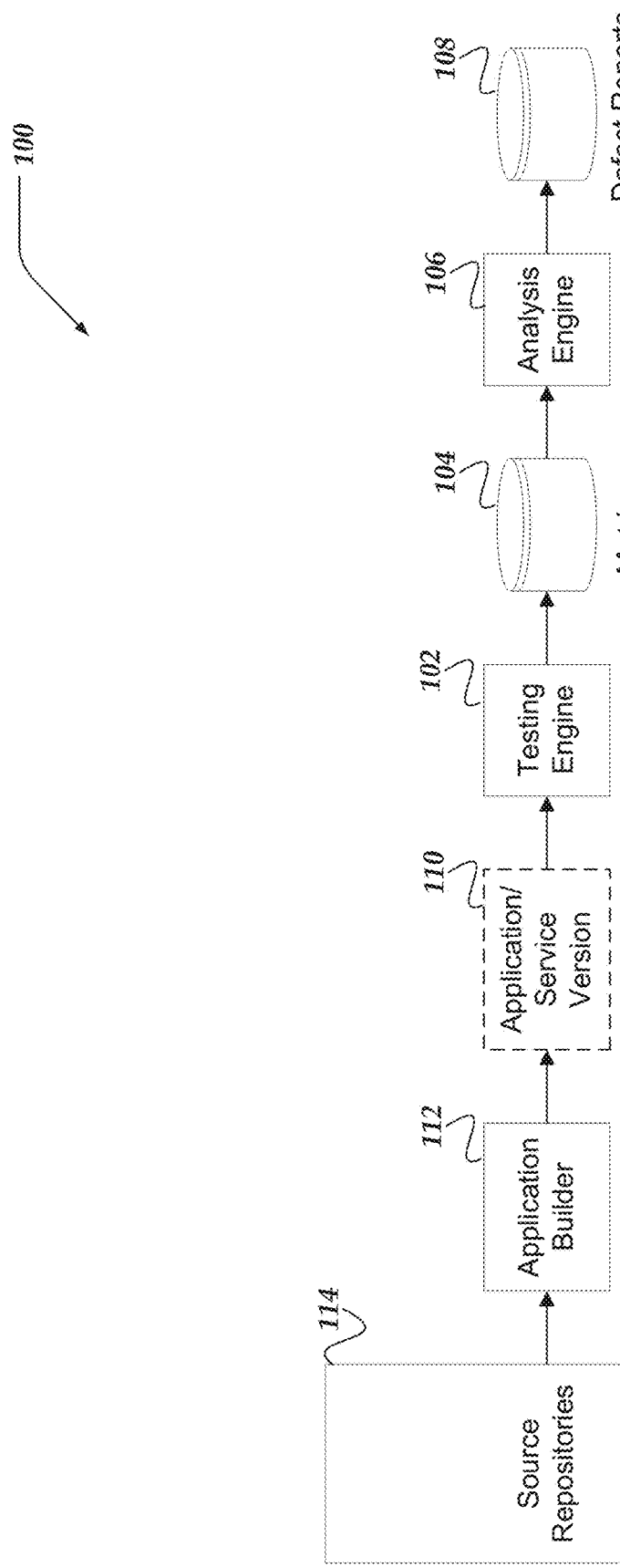
FIG. 1 illustrates a logical schematic of a system for automated regression investigator in accordance with one or more of the various embodiments.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, JavaScript, Ruby, Python, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage device and be stored on and executed by one or more general purpose computers, thus creating a special purpose computer configured to provide the engine.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing services over a network using one or more processors directed towards automated investigation of regression or other defects.

In one or more of the various embodiments, a time-series of values for a metric associated with an execution of a verification action for a service may be provided such that each value in the time-series corresponds to a version of the service and the execution of the verification action and such that the metric may be associated with a control range that declares a range of acceptable values for the metric.

In one or more of the various embodiments, in response to determining a metric value in the time-series of values that is outside of the control range, further actions may be performed, including: determining a last valid version of the service based on the time-series of values and the control range; determining a first invalid version of the service based on the time-series of values, the control range and the metric value such that the first invalid version of the service is associated with the metric value that is outside of the control range; determining one or more changes associated with one or more differences between the last valid version of the service and the first invalid version of the service based on the time-series of values; determining one or more responsible users based on the one or more determined changes; generating a defect report based on the one or more changes and the metric value that is outside of the control range such that the one or more responsible users are associated with the defect report; or the like.

In one or more of the various embodiments, an upper bound value for the metric value may be determined based on the time-series of values. In one or more of the various embodiments, a lower bound value for the metric value may be determined based on the time-series of values. In some embodiments, the upper bound value and the lower bound value to may be employed to determine the control range.

In one or more of the various embodiments, determining a first invalid version of the service may include: determining one or more clusters of metric values in the time-series of values based on grouping the time-series of values; determining one or more cluster boundaries in the time-series or values based on the one or more clusters of metric values; determining the first invalid version of the service based on the one or more cluster boundaries associated with the metric value that may be outside of the control range; or the like.

In one or more of the various embodiments, determining a last valid version of the service may include: determining one or more clusters of metric values in the time-series of values based on grouping one or more values in the time-series of values; determining one or more cluster boundaries in the time-series or values based on the one or more clusters of metric values; determining the last valid version of the service based on the one or more cluster boundaries associated with a metric value that is within the control range; or the like.

In one or more of the various embodiments, one or more metric values in the time-series of values may be compared with an upper bound of the control range. In some embodiments, in response to the comparison indicating that a sequence of the one or more metric values are less than the upper bound of the control range, further actions may be performed, including: determining a new upper bound based on the sequence of the one or more metric values such that the new upper bound may be less than the upper bound of the control range; modifying the control range to include the new upper bound; employing the modified control range to determine one or more subsequent out-of-range metrics; or the like.

In one or more of the various embodiments, a first confidence check value may be generated based on the last valid version of the service, in some embodiments, a second confidence check value may be generated based on the first invalid version of the service. in one or more of the various embodiments, in response to the first confidence check value being within the control range and the second confidence check value being outside of the control range, confirming that the metric value in the time-series of values is outside of the control range.

In one or more of the various embodiments, one or more other time-series of other values for one or more other metrics associated with the execution of one or more other verification actions for the service may be provided. In one or more of the various embodiments, the time-series of values for the metric with the one or more other time-series of other values may be compared. In one or more of the various embodiments, a portion of the one or more other metrics that may be outside of the one or more control ranges may be determined based on the comparison. In some embodiments, information associated with the portion of the one or more other metrics may be included in the defect report.

Illustrative Logical System Architecture

FIG. 1 illustrates a logical schematic of system 100 for automated regression investigator in accordance with one or more of the various embodiments. In one or more of the various embodiments, an automated regression investigator may include one or more of testing engine 102, metrics data store 104, analysis engine 106, defect report 108, or the like. Accordingly, in some embodiments, testing engines, such as, testing engine 102 may be arranged to perform or execute one or more verification actions that may test or otherwise exercise one or more features or functions of an application or service.

In one or more of the various embodiments, applications or services (hereinafter referred to jointly as services) may be generated by one or more application builders, such as, application builder 112. In some embodiments, application builders may be arranged to generate versions of a service from source code, base components, templates, configuration data, test data, or the like, that may be stored in one or more repositories, such as, source repositories 114.

In one or more of the various embodiments, application builders, such as, application builder 112 may include various compilers, linkers, transpilers, make tools, encoders, cross-compilers, interpreters, assemblers, or the like, that may be configured to generate service version from source repositories. Accordingly, in some embodiments, application builders may be assumed to represent the one or more different applications, tools, or processes, that may be arranged to operate in sequence or in parallel to generate a service that may be deployed for operational purposes or (as in this example) for testing or verification. One of ordinary skill in the art will be familiar with various application builders that may be configured to generate executable services from various source repositories.

In some embodiments, source repositories, such as, source repositories 114 may be referred to as source control systems, version control systems, change management systems, or the like, that may enable software developers to systematically manage the underlying source code (or other data) that may be employed to generate services. In some cases, for some embodiments, file systems used to store files, source code files, service data, service modules, configuration information, or the like, may be considered source repositories as well.

One of ordinary skill in the art will be familiar with various types of source repository systems that may provide similar or overlapping features, such as, version/change tracking, change attribution, change timestamps, support for branching, support for version labeling, file locking, version merging, atomic operations, change lists, tagging, or the like. In some embodiments, source repositories may be arranged to provide open or otherwise accessible interfaces or APIs that may enable features of the source repositories to be manually or programmatically executed. In some cases, organizations may provide one or more customized software tools or utilities that augment various built-in features of source repositories.

In one or more of the various embodiments, a service version may be considered to be a service that has been generated from a particular version to the source code. Accordingly, as source code, or the like, is added or modified, new versions of the service may be generated.

In one or more of the various embodiments, application/service version 110 may represent a version of a service that has been generated by an application builder, such as, application builder 112. In this example, service version 110 is illustrated using a dashed-line border because a particular service version may be transient in the sense that as changes to source code occur, new service versions may be generated for verification.

In one or more of the various embodiments, testing engine 102 may represent one or more tools or utility programs that may be configured to automatically/programmatically execute one or more actions for verifying one or more features of a service version. In some embodiments, testing engine 102 may represent two or more different programs or tools that may perform one or more actions to verify features or performance goals for a service version.

In some embodiments, testing engines may be arranged to measure one or more characteristics of computers that may be hosting the service version being tested. For example, in some embodiments, testing engines may include programs that measure CPU utilization, memory utilization, thread count, network utilization, storage accesses, or the like.

In one or more of the various embodiments, testing engines may be arranged to simulate user input or 'read' user-interfaces of service versions. In some embodiments, different testing tools may be employed for simulating user input, reading (e.g., screen scraping) user interfaces, accessing APIs provided by a service version, or the like.

In one or more of the various embodiments, testing engines may be arranged to collect or measure one or more metrics associated with the operation or performance of a service version. In some embodiments, one or more verification actions executed by the testing engine may generate one or more metric values. Accordingly, in some embodiments, metric values may be stored in a database or data store, such as, metrics data store 104.

Also, in some embodiments, services may be arranged to generate one or more metric values that may be collected and stored in metrics data store 104. For example, in some embodiments, service developers may include instructions in the service to write various metrics to a log file, database, or the like. Accordingly, in some embodiments, testing engines may be arranged to collect these metrics and include them in the metrics data store. In some embodiments, metrics may be stored in one or more different data stores. For example, in some embodiments, a service version may write metrics to a service database rather than the metrics data store. Accordingly, in this example, the testing engine may be configured to obtain these metrics from the service database to include them in the metrics data store. Further, in one or more of the various embodiments, testing engines may be arranged to obtain metrics from other databases on-demand rather than copying metrics into a centralized metrics data store.

In one or more of the various embodiments, an arbitrary number of metrics may be provided. In some embodiments, metrics may be associated with an identifier, such as, a serial number, label, or GUID. Also, in some embodiments, metrics may be associated with a direction or sense that indicates if a lower or higher value for the metric may be preferred. For example, a metric associated with CPU utilization may be indicated as having a negative sense such that if its value decreases, the performance of the service version may be considered to improve. In contrast, a metric value associated with transaction rate may have a positive sense such as increases in transaction rate (e.g., transaction/sec) may correspond to performance improvements for the service.

In one or more of the various embodiments, analysis engines, such as, analysis engine 106 may be arranged to process metric values to identify potential defects in the operation of the service version. In some embodiments, analysis engines may be arranged to process a time-series of values for one or more metrics to determine if there may be significant changes to metric values as compared to other version of the same service. Accordingly, in one or more of the various embodiments, analysis engines may be arranged to identify defects that may be observed in service version.

Further, in some embodiments, analysis engines may be arranged to determine which source changes may have contributes to the observed deficiencies. Accordingly, in some embodiments, analysis engines may be arranged to determine one or more responsible parties (e.g., developers, teams, departments, or the like) that may be associated with the defect based on a correlation between specific changes and observed defects. Thus, in some embodiments, if analysis engines may determine the changes that are correlated with an anomalous metric value, information provided by the source repositories may be employed to identify one or more responsible parties.

Accordingly, in some embodiments, analysis engines may be arranged to automatically generate defect report that includes information about the discovered defects. In one or more of the various embodiments, analysis engines may be arranged to generate defect reports based on one or more templates, formats, or the like. Accordingly, in some embodiments, the particular information included in a defect report may vary depending on local requirements or local circumstances. For example, in some embodiments, analysis engines may be arranged to employ rules, templates, or the like, provided via configuration information to generate defect reports that may conform to local requirements or local circumstances.

In one or more of the various embodiments, the particular reason or meaning of one or more metrics may be opaque to the analysis engines. In some embodiments, analysis engines may be arranged to determine the metrics associated with anomalous or undesirable changes in the value of the metric without considering the underlying purpose or meaning of the metric. Accordingly, in some embodiments, service developers may introduce new metrics without introducing dependencies in the analysis engines. For example, in some embodiments, a new metric may be introduced by assigning it an identifier and a sense/direction. Accordingly, in some embodiments, analysis engines may be arranged to evaluate metrics absent an understanding of the purpose of the metric.

In one or more of the various embodiments, analysis engines may be arranged to employ a time-series of metric values to determine a control range of acceptable/preferred values for a given metric. In some embodiments, analysis engines may be arranged to employ one or more statistical methods to establish upper bounds, lower bounds, and baseline values for a given metric.

Also, in some embodiments, if a metric is improved overtime, analysis engines may be arranged to automatically adjust the control range to establish upper or lower bounds that reflect the improvement in features of a services.

Figure 2:
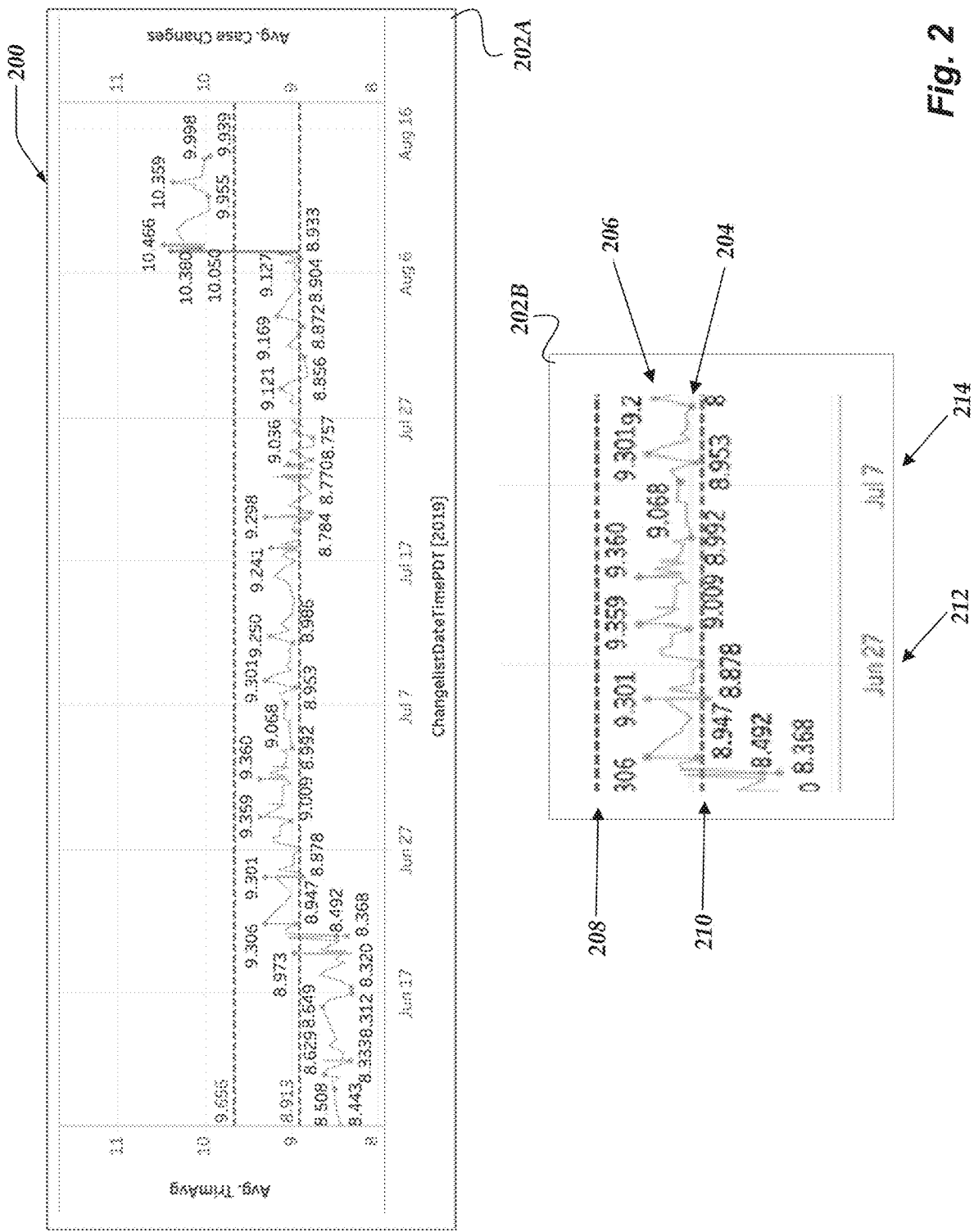
FIG. 2 illustrates a logical schematic of a time-series for represent metric values for automated regression investigator in accordance with one or more of the various embodiments.

FIG. 2 illustrates a logical schematic of time-series 200 for represent metric values for automated regression investigator in accordance with one or more of the various embodiments. As described above, in some embodiments, testing engines may be arranged to generate or collect various metrics that may be provided as a time-series of value to analysis engines for automated regression investigations. In this example, time-series 202A represents a time-series of values for a metric. Also, in this example, time-series portion 202B represents an enlarged view of a portion of time-series 202A. In this example, the particular purpose of the metric or the one or more features it may represent may be considered immaterial.

In some embodiments, time-series of metric values may be based on metric values collected during particular runs/ executions of particular service versions. Accordingly, in this example, for some embodiments, value 204 represents a recorded metric value that occurred for a verification run while value 206 represents a recorded metric value collected from a subsequent verification run. Also, in this example, line 208 may represent an upper bound for the metric while line 210 may represent a baseline or average value for the metric. And, in this example, date label 212 and date label 214 may represent the time-line that corresponds to the time-series.

In some embodiments, for some metrics metric values may not be deterministic or otherwise precisely repeatable. For example, some metric values associated with performance of a service may vary across runs even though there has not been any source code changes. For example, various operating system actions that may be unrelated with the operation of the service may trigger inter-run variations in metric values.

Figure 3:
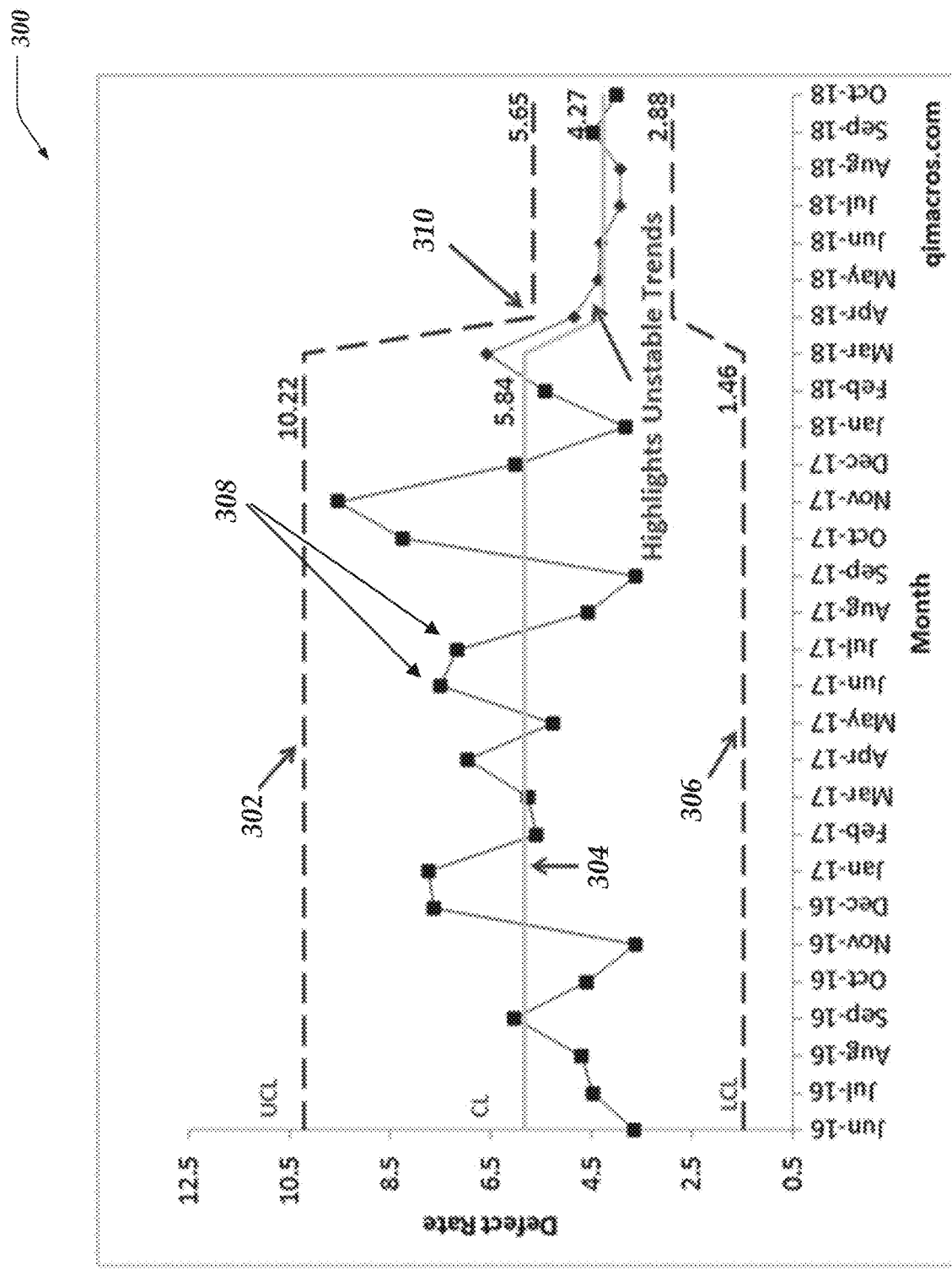
FIG. 3 illustrates a logical schematic of a time-series for automated regression investigator in accordance with one or more of the various embodiments.

FIG. 3 illustrates a logical schematic of time-series 300 for automated regression investigator in accordance with one or more of the various embodiments. In this example, time-series 300 is illustrated with a control range that includes upper-bound line 302, baseline line 304, and lower-bound line 306. Also, in this example, points 308 represent metric values for different service versions or verification actions. Note, in most cases, each metric value in a time-series of metric value may be associated with a different service version though in some cases, for some embodiments, the same service version may be tested more than once producing different values. However, for brevity and clarity each metric value in a time-series of values may be considered to be associated with a different service version.

Also, in this example, for some embodiments, adjustment point 310 represents a position in the time-series where an analysis engine has adjusted an upper-bound line to reflect observed improvements in the metric of concern. For example, if source code changes (e.g., performance improvements) result in a consistent improvement, analysis engines may be arranged to adjust the control range for a metric accordingly. Thus, if a subsequent change causes a performance regression, that regression may be observed/ captured.

Figure 4:
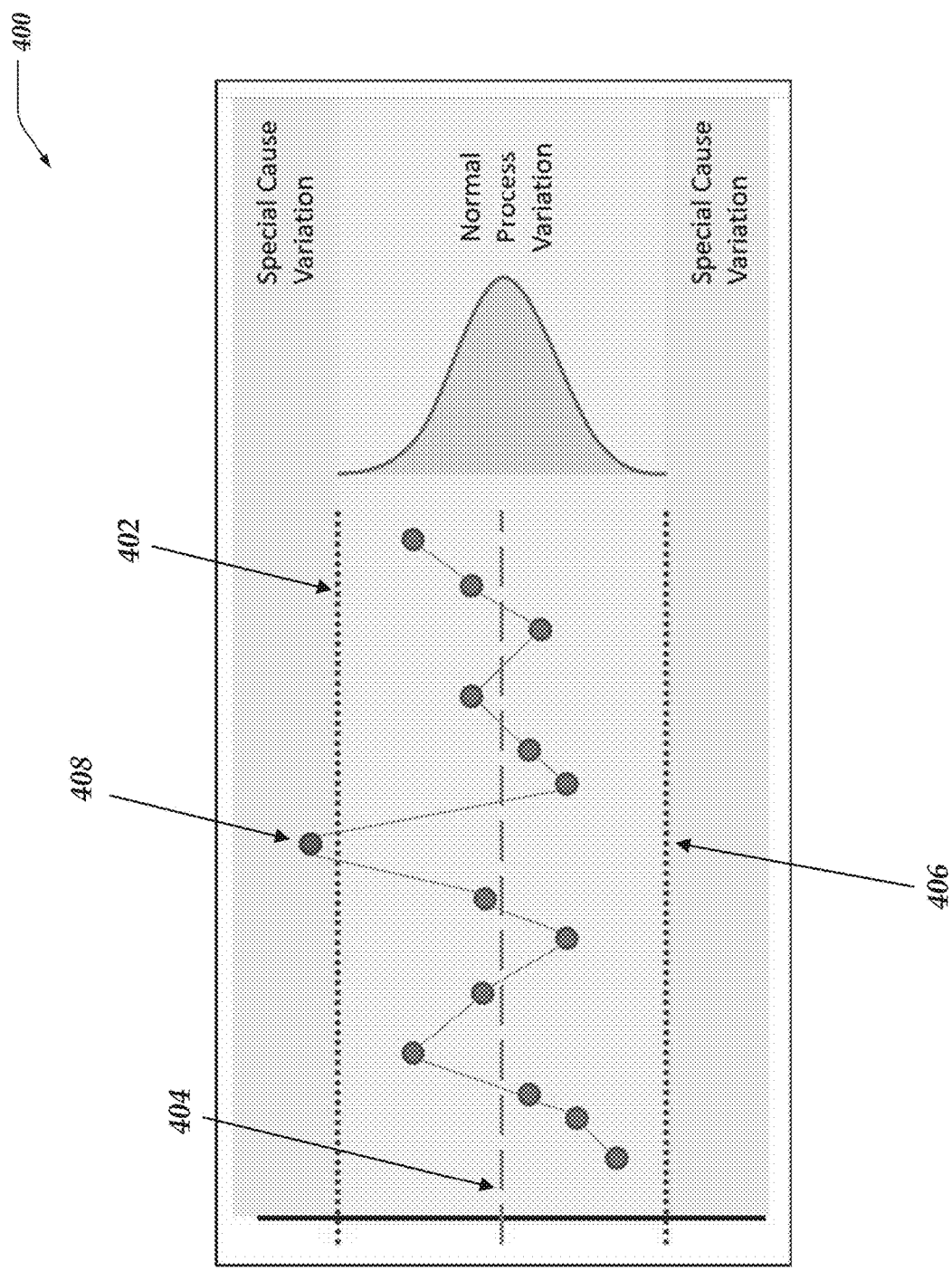
FIG. 4 illustrates a logical schematic of a control range for automated regression investigator in accordance with one or more of the various embodiments.

FIG. 4 illustrates a logical schematic of control range 400 for automated regression investigator in accordance with one or more of the various embodiments. As described above, analysis engines may be arranged to determine a control range for each time-series of metric values. Accordingly, in some embodiments, control range 400, includes upper-bound line 402, baseline line 404, or lower-bound line 406. In some embodiments, the lower-bound line may be omitted from consideration.

In some embodiments, analysis engines may be arranged to compute control range lines based on a statistical analysis of the time-series values. In some embodiments, the specific analysis may vary depending on local requirements.

In one or more of the various embodiments, control ranges may be established to accommodate metrics that may incur normal or expected variation. Accordingly, in some embodiments, metric values that fall outside the control range may be considered special cause variations that may be expected to be related to defects or regressions associated with one or more changes associated with a service version.

In one or more of the various embodiments, analysis engines may be arranged to determine the control range for a given metric based on instructions, rules, formulas, coefficients, or the like, provided via configuration information to account for local requirements or local circumstances. For example, in some embodiments, one or more statistical features of the time-series values, such as, variance, standard deviation, mean, or the like, may be applied to determine control ranges.

Figure 5:
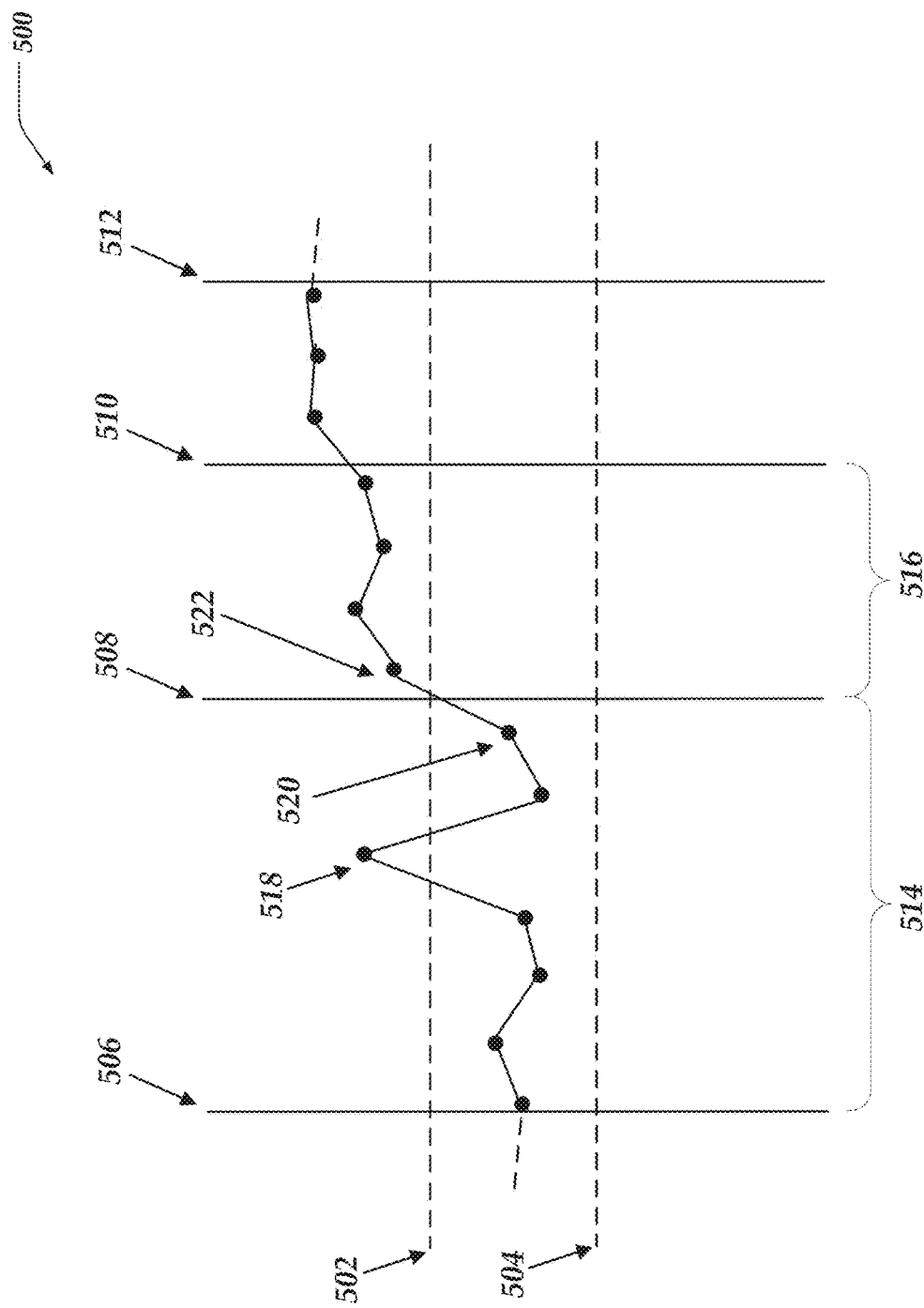
FIG. 5 illustrates a logical representation of a time-series for automated regression investigator in accordance with one or more of the various embodiments.

FIG. 5 illustrates a logical representation of time-series 500 for automated regression investigator in accordance with one or more of the various embodiments. As described above, testing engines may be arranged to generate time-series values for various metrics associated with a service version.

In one or more of the various embodiments, metric values in a time-series may have a natural or expected variation. Accordingly, in some embodiments, for some metrics, viewing/analyzing individual metric values may be disadvantageous because it may be difficult to discern differences in values driven by the natural variance from differences caused by changes between service versions.

Further, in some embodiments, changes that introduce repeatable/persistent defects may be expected to consistently effect one or more metric values. In contrast, in some embodiments, spurious environmental effects, non-deterministic conditions, or the like, may cause a metric value change that is not generally repeatable. However, in some cases, given that there may be a natural or otherwise unavoidable variance, analysis engines may be arranged to cluster metric values to determine identify substantive metric value changes or if the metric may be anomalous.

In this example, for some embodiments, time-series 500 represents how metric values in a time-series may be clustered. In this example, for some embodiments, cluster boundary 506, cluster boundary 508, cluster boundary 510, and cluster boundary 512 indicate clusters of metric values that may be evaluated using a control range.

In one or more of the various embodiments, analysis engines may be arranged to determine the natural boundary between portions of a time-series using various clustering or group methods. In some embodiments, analysis engines may be arranged to enable organizations to provide one or more plug-ins, libraries, instructions, parameters, or the like, via configuration information that may determine the particular clustering/group method. For example, in some embodiments, analysis engines may be configured to employ methods, such as, Jenks natural breaks classification, or the like, to determine cluster boundaries. One of ordinary skill in the art will appreciate that other clustering methods may be employed without departing from the scope of the disclosed innovations. Likewise, in some embodiments, analysis engines may be configured to employ different clustering methods for different metrics associated with same service.

In one or more of the various embodiments, analysis engines may be arranged to employ cluster boundaries to determine the transition between service versions that introduce improvements, service degradation, or regressions. Accordingly, in some embodiments, analysis engines may be arranged to determine a last known good version and a first known bad version of a service based on the cluster boundaries. For example, time-series 500 shows that except for one service version the metric values in cluster 514 are within the control range. Note, in this example, value 518 may be considered a spurious result that may be unrelated to service version change. In contrast, in this example, each metric value in cluster 516 is out of the control range. Accordingly, in some embodiments, version changes that occur after cluster boundary 508 may be considered correlated with the increase in the metric values in cluster 516.

In one or more of the various embodiments, analysis engines may be arranged to employ cluster boundaries to identify version changes that may contribute to changes in metric values. Accordingly, in some embodiments, analysis engines may be arranged to interrogate source repositories to determine the particular version changes that occur at or around cluster boundaries. Thus, in some embodiments, analysis engines may be arranged to determine one or more responsible parties based on determining the users/teams/departments that were responsible for providing the changes that resulted in the metric value changes. Note, in some embodiments, analysis engines may be arranged to interrogate source repositories using APIs or other interfaces provided by the source repositories. Also, in some embodiments, the data structures that include time-series information may include information about the service version changes that include identifying the parties that introduced the change to the source repository. For example, in some embodiments, a time-series data structure may be augmented to include an identifier of the user that provided the version changes.

In this example, for some embodiments, metric value 520 may correspond to the last known good service version because metric value 520 has a value that is less than the upper-bound line. And, in this example, metric value 522 may correspond to first known bad service version because metric value 522 has a value greater than the upper-bound line. Accordingly, in this example, analysis engines may determine one or more version changes that may have occurred between the service version that corresponds to metric value 520 and the service version that corresponds to metric value 522. Note, in some embodiments, one or more changes may occur between service versions. For example, if service versions are generated every two days, changes submitted across the two days may be included in each version. Likewise, for example, if a service version is generated and metrics are generated for each change, there may be a one-to-one correspondence of changes and service versions. Note, in some embodiments, analysis engines may be arranged to generate service versions at a frequency determined based on configuration information to account for local requirements or local circumstances. Also, in some embodiments, analysis engines may be arranged to enable users to manually trigger the generation or testing of a service version.

Figure 6:
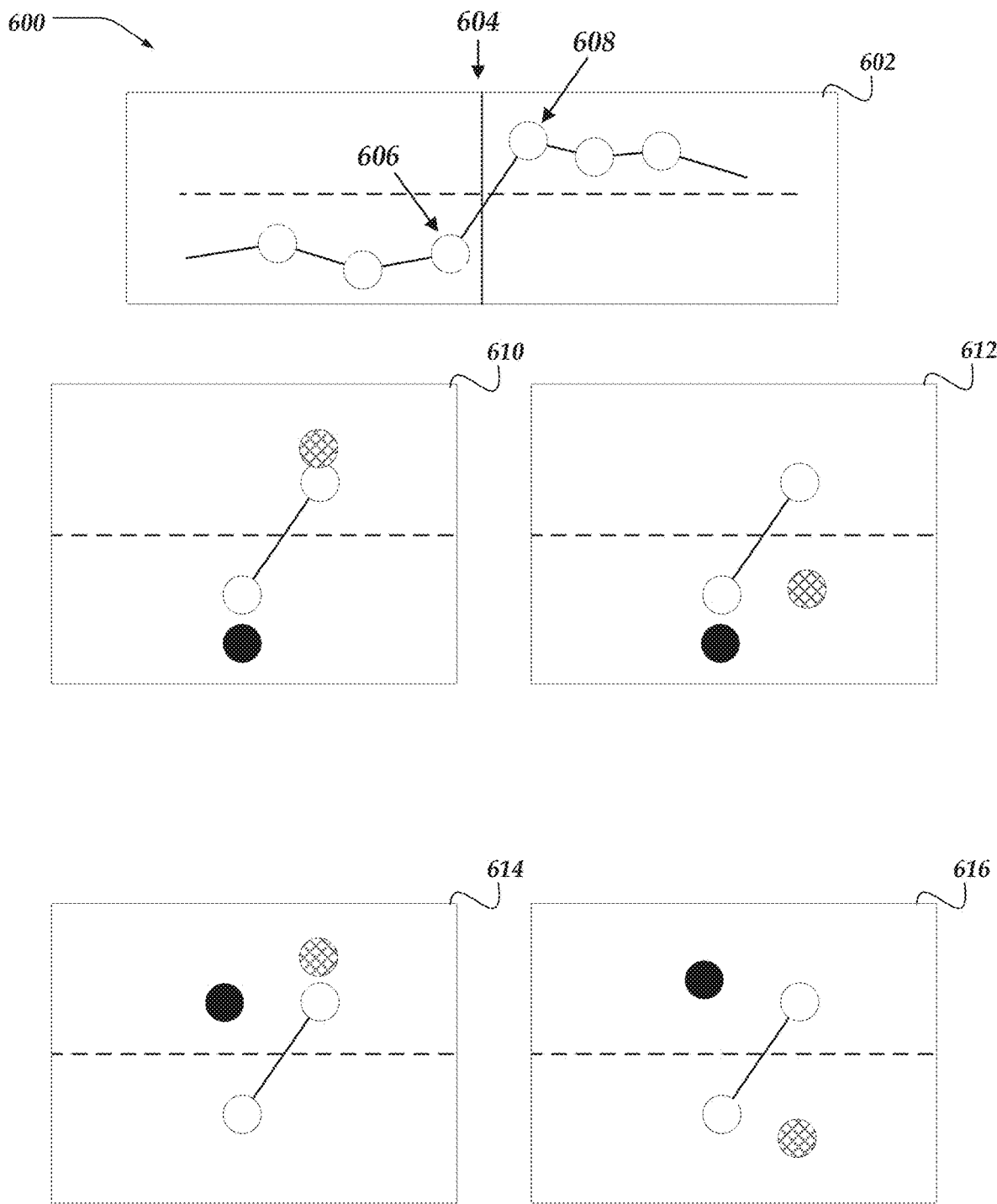
FIG. 6 illustrates a logical schematic of a confidence system for automated regression investigator in accordance with one or more of the various embodiments.

FIG. 6 illustrates a logical schematic of confidence system 600 for automated regression investigator in accordance with one or more of the various embodiments. As described above, in some embodiments, some verification actions for some metrics may inherently produce variable results. For example, in some embodiments, verification actions for generating some performance related metrics may be likely to produce metric values with significant variation. Accordingly, in some embodiments, if analysis engines determine a metric value may be outside of its control range, analysis engines may be arranged to execute one or more confidence checks intended to reduce the number of false positives that the natural variability of performance results may be introduce.

Accordingly, in some embodiments, analysis engines may be arranged to determine a last known good service version and a first known bad service version for a given metric based on the cluster boundaries determined from a time-series of metric values. Thus, in this example, the service version associated with value 606 may be considered a last known good service version and the service associated with value 608 may be considered the first known bad service version.

In some embodiments, analysis engines may be arranged to re-run one or more verification actions against the last known good service to collect a confidence check value for the 'good' metric value. Likewise, in some embodiments, analysis engines may be arranged to re-run the same verification actions against the first known bad service version to collect a confidence check value for the 'bad' metric value.

Accordingly, in some embodiments, analysis engines may be arranged to compare the confidence check value for the good metric value and confidence check value for the bad metric value to their respective original values determined from the cluster boundary. Accordingly, in some embodiments, analysis engines may be arranged to determine if a verification result may be valid if the confidence check metric values are on the same side of the control range boundary as they were in the original verification run.

In this example, comparison 610 shows a confidence check that may confirm the result because the confidence check good metric value (e.g., black filled circle) is below the upper-bound line and the confidence check bad metric value (e.g., check-filled circle) is above the upper-bound line. Thus, as shown here, even though the actual values of the original metric values and the confidence check metric values are different, the confidence check metric values confirm that there may be an issue associated with the metric because the confidence check metric values remain on the 'correct' side of the upper-bound line. In contrast, for example, comparison 612, comparison 614, and comparison 616 fail to confirm that there may be issues with the metric because their values with-respect-to upper-bound line are inconsistent with the original metric values produced during the original verification run.

Further, one of ordinary skill in the art will appreciate that analysis engines may be arranged to apply other or additional confidence checks to confirm or evaluate if metric values may be associated with potential defects or other issues. Accordingly, in some embodiments, analysis engines may be arranged to determine the particular confidence checks based on one or more plug-ins, extensions, libraries, instructions, rules, or the like, provided via configuration information to account for local requirements or local circumstances.

Generalized Operations

FIGS. 7-12 represent generalized operations for automated regression investigator in accordance with one or more of the various embodiments. In one or more of the various embodiments, processes 700, 800, 900, 1000, 1100, and 1200 described in conjunction with FIGS. 7-12 may be implemented by or executed by one or more processors on a single network computer, such as network computer 1600 of FIG. 16. In other embodiments, these processes, or portions thereof, may be implemented by or executed on a plurality of network computers, such as network computer 1600 of FIG. 16. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-12 may be used for automated regression investigator in accordance with at least one of the various embodiments or architectures such as those described in conjunction with FIGS. 1-6. Further, in one or more of the various embodiments, some or all of the actions performed by processes 700, 800, 900, 1000, 1100, and 1200 may be executed in part by testing engine 1622, analysis engine 1624, or the like, running on one or more processors of one or more network computers.

Figure 7:
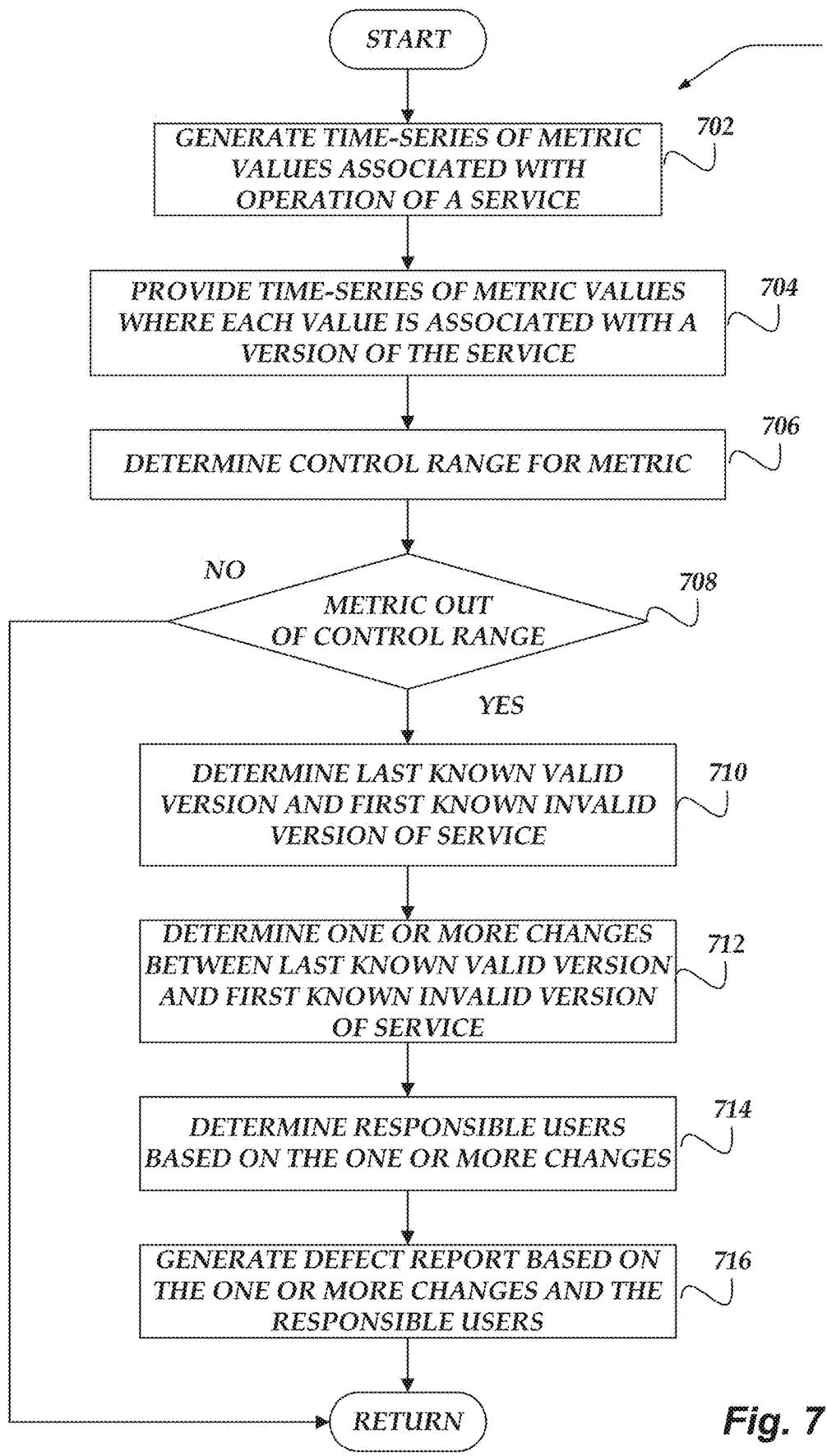
FIG. 7 illustrates an overview flowchart for a process for automated regression investigator in accordance with one or more of the various embodiments.

FIG. 7 illustrates an overview flowchart for process 700 for automated regression investigator in accordance with one or more of the various embodiments. After a start block, at block 702, in one or more of the various embodiments, time-series of values of metrics associated with an operation of a service may be generated. In some embodiments, each time-series value may correspond to a service version or an instance of a verification run or test run for the service.

In some embodiments, testing engines may be arranged to perform various verification actions for each version of a service. In some embodiments, verification actions may be configured to produce one or more values for one or more metrics associated with the operation of the service version.

In some embodiments, testing engines may be arranged to associate metric values with particular verification runs or service versions. In some embodiments, the metric values for a service collected from a sequence of version may be referred to as a time-series of values where each time-series 'bucket' is associated with different service version or verification run. One of ordinary skill in the art may appreciate that a time-series of values of metrics may not strictly speaking be a time-series. However, for brevity and clarity the collection of values for a single metric where each value corresponds to a service version or verification runs is referred to a time-series of metric values. Note, each considered metric may be assumed to have a corresponding time-series that is separate from time-series for other metrics.

At block 704, in one or more of the various embodiments, the time-series of metric values may be provided to an analysis engine. In some embodiments, analysis engines may be configured to obtain time-series information for one or more metrics. In some embodiments, analysis engines may be arranged to operate on more than one metric in parallel. However, for brevity and clarity analysis engines may be described as processing one metric of interest at a time.

At block 706, in one or more of the various embodiments, analysis engines may be arranged to determine a control range for the metric. As described above, in some embodiments, control ranges may declare an upper-bound line (value) or a lower bound line (value) for the metric of interest. In some embodiments, control ranges may be declared manually. In other cases, for some embodiments, analysis engines may automatically generate control ranges based on metric values included in the time-series of metric values. For example, in some embodiments, analysis engines may be arranged to compute mean and standard deviation information for a metric based on metric values included in the time-series of metric values. Thus, in some embodiments, some or all metrics or some or all services may have different control ranges. For example, an organization may tune or otherwise adapt control ranges to account for local requirement or local circumstances depending on individual metrics or service characteristics.

At decision block 708, in one or more of the various embodiments, if the metric may be determined to have a value that may be outside of the control range, control may flow block 710; otherwise, control may be returned to a calling process.

At block 710, in one or more of the various embodiments, analysis engines may be arranged to determine a last known valid version of the service and a first known invalid version of the service. As described above, in some embodiments, analysis engines may be arranged to cluster metric values in a time-series to determine 'breaks' that may correlate with a degradation or improvement in a metric. Accordingly, in some embodiments, the last service version that was tested before the break occurred may be considered the last known valid version and the first service version that occurs after the break may be considered the first known invalid version. Likewise, in some embodiments, if a break in the time-series of metric values may be correlated with an improvement in a metric value, the service version that comes immediately before the break in the time-series may be considered the last known valid version and the service version that comes immediately after the break may be considered the first known invalid version.

At block 712, in one or more of the various embodiments, analysis engines may be arranged to determine one or more changes between the last known valid version of the service and the first known invalid version of the service. In one or more of the various embodiments, source repositories (or similar systems) may closely track the changes that may contribute to differences between service versions. For example, in some embodiments, if a software development team checks-in (e.g., submits) source code changes, the source repository may record information, such as, differences introduced by the changes, the time of the change, the responsible parties, description of the change, or the like.

Accordingly, in some embodiments, analysis engines may be arranged to employ the information made available by source repositories to precisely determine the changes to the service that may have occurred between the last known valid service version and the first known invalid service version.

At block 714, in one or more of the various embodiments, analysis engines may be arranged to determine one or more responsible users based on the one or more changes. In one or more of the various embodiments, analysis engines may be arranged to determine the one or more responsible parties based on the information included in the source repositories. In some embodiments, source repositories may provide one or more APIs or interfaces that enable programmatic interrogation of changes, change lists, responsible parties, or the like, directly from the source repository.

At block 716, in one or more of the various embodiments, analysis engines may be arranged to generate one or more defect reports based on the one or more changes and the responsible users.

Next, in one or more of the various embodiments, control may be returned to a calling process.

Figure 8:
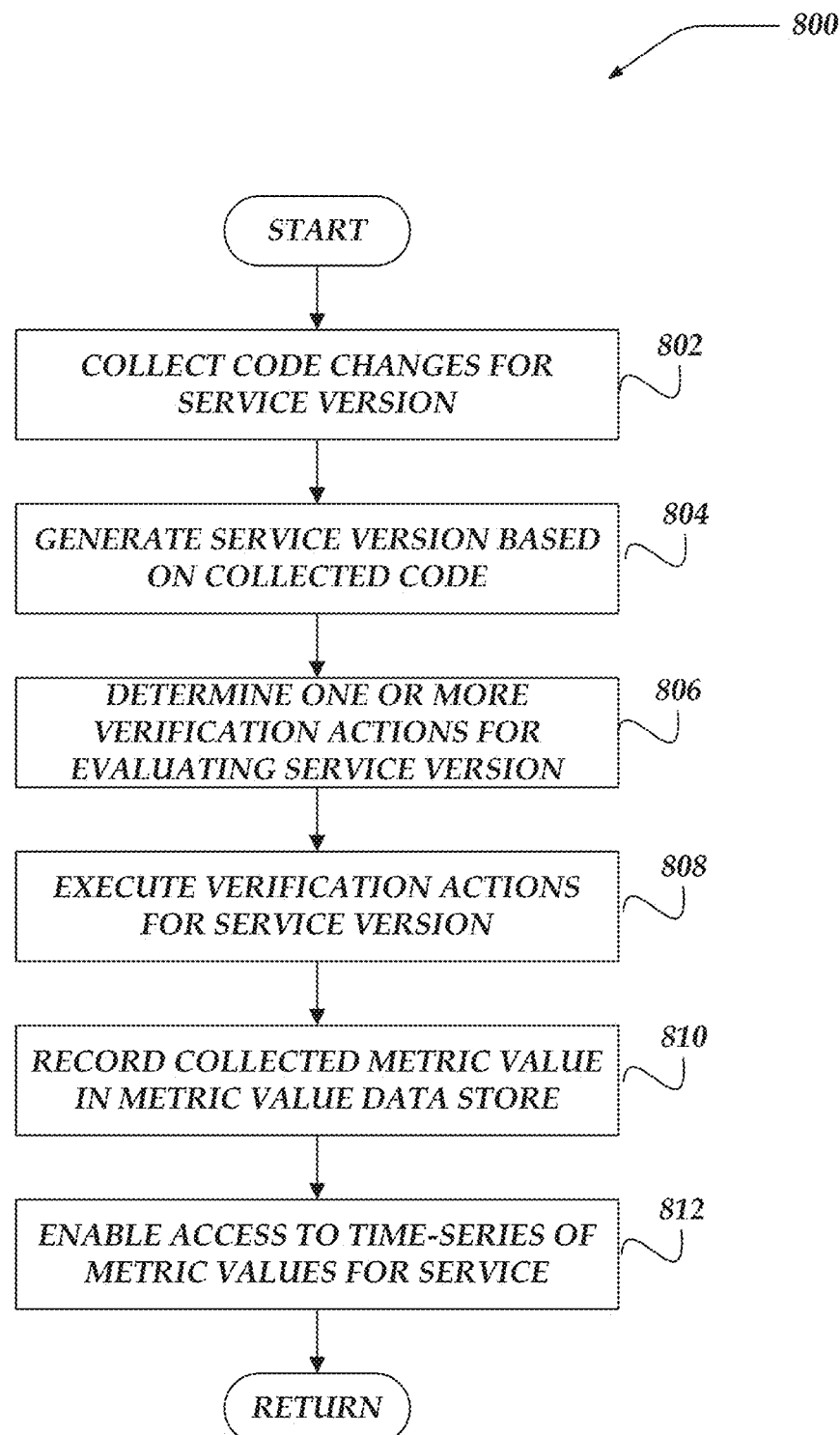
FIG. 8 illustrates a flowchart for a process for automated regression investigator in accordance with one or more of the various embodiments.

FIG. 8 illustrates a flowchart for process 800 for automated regression investigator in accordance with one or more of the various embodiments. After a start block, at block 802, in one or more of the various embodiments, testing engines may be arranged to collect one or more changes for a service version. As described above, in some embodiments, testing engines may be arranged to automatically pull together various service version changes from one or more source repositories. In some embodiments, changes may include service configuration changes rather than being limited to changes in the source code. In some cases, changes may include modifications to one or more service components, changes or additional related to integrating services with one or more external services, APIs, or interfaces.

In some embodiments, testing engines may be arranged to execute one or more scripts, or the like, to collect changes, prepare computing environments, or the like. In some embodiments, one or more manual operations may be executed to determine a set of changes that should be included in a service versions.

At block 804, in one or more of the various embodiments, testing engines (or application builders) may be arranged to generate a service version based on the collect code changes. As described above, application builders may be considered to be the applications, services, programs, tools, scripts, or the like, employed to generate a service version. In some cases, for some embodiments, application builders may be arranged to deploy or install a service version into a computing environment suitable for executing a verification run. In some embodiments, application builders may comprise one or more build-run frameworks that support one or more of continuous deployment, continuous integration, continuous delivery, or the like. Also, in some embodiments, application builders may comprise one or more components/ steps that may be stitched together by one or more custom scripts, delivery/builder platforms, or the like.

At block 806, in one or more of the various embodiments, testing engines may be arranged to determine one or more verification actions for evaluating the function or performance of the service version. In one or more of the various embodiments, services may be associated with one or more verification specifications that declare a number of verification actions that may be executed as part of a verification run.

At block 808, in one or more of the various embodiments, testing engines may be arranged to execute the one or more verification actions for the service version. In some embodiments, verification actions may include exercising the service version to perform one or more actions that simulate production usage. Also, in some embodiments, one or more verification actions may include collecting one or more metrics based on monitoring one or more characteristics of the computing environment that may be hosting the service version. Also, in some embodiments, one or more verification actions may include querying one or more data stores that may store values generated or otherwise associated with the service version. Further, in some embodiments, one or more verification actions may include providing simulated user-input to one or more user-interfaces of the service version. Also, in some embodiments, one or more verification actions may include collecting data/information from user interfaces as part of collecting metrics.

In some embodiments, service versions may be configured to automatically generate log records or other data that may include metric values.

At block 810, in one or more of the various embodiments, testing engines may be arranged to record one or more collected metric values in a metric value data store. In some embodiments, testing engines may be arranged to automatically store some or all metric values directly into a metric data store. In other cases, for some metrics, analysis engines may be arranged to collect metric values from various locations and add them to the centralized metrics data stores. For example, in some embodiments, a service version may be arranged to write metric values to a log file. Accordingly, in some embodiments, testing engines may be arranged to parse the log files to extract relevant metric values and add them to a metrics data store.

At block 812, in one or more of the various embodiments, testing engines may be arranged to enable analysis engines to access a time-series of the metric values for the service. In some embodiments, metrics data stores may be time-series databases that inherently support time-series representation of data. Also, in some embodiments, metrics data stores may be conventional (e.g., not time-series focused) data stores that may support schemas or queries that enable time-series of metric values to be obtained. For example, in some cases, for some embodiments, a metrics data store may be a conventional RDBMS that may be configured to support SQL-queries that may produce result sets that may be suitable analyzing as time-series.

Accordingly, in some embodiments, analysis engines may be arranged to integrate with one or more APIs or interfaces that may be associated with metrics data store to access time-series of metric values for the service.

Next, in one or more of the various embodiments, control may be returned to a calling process.

Figure 9:
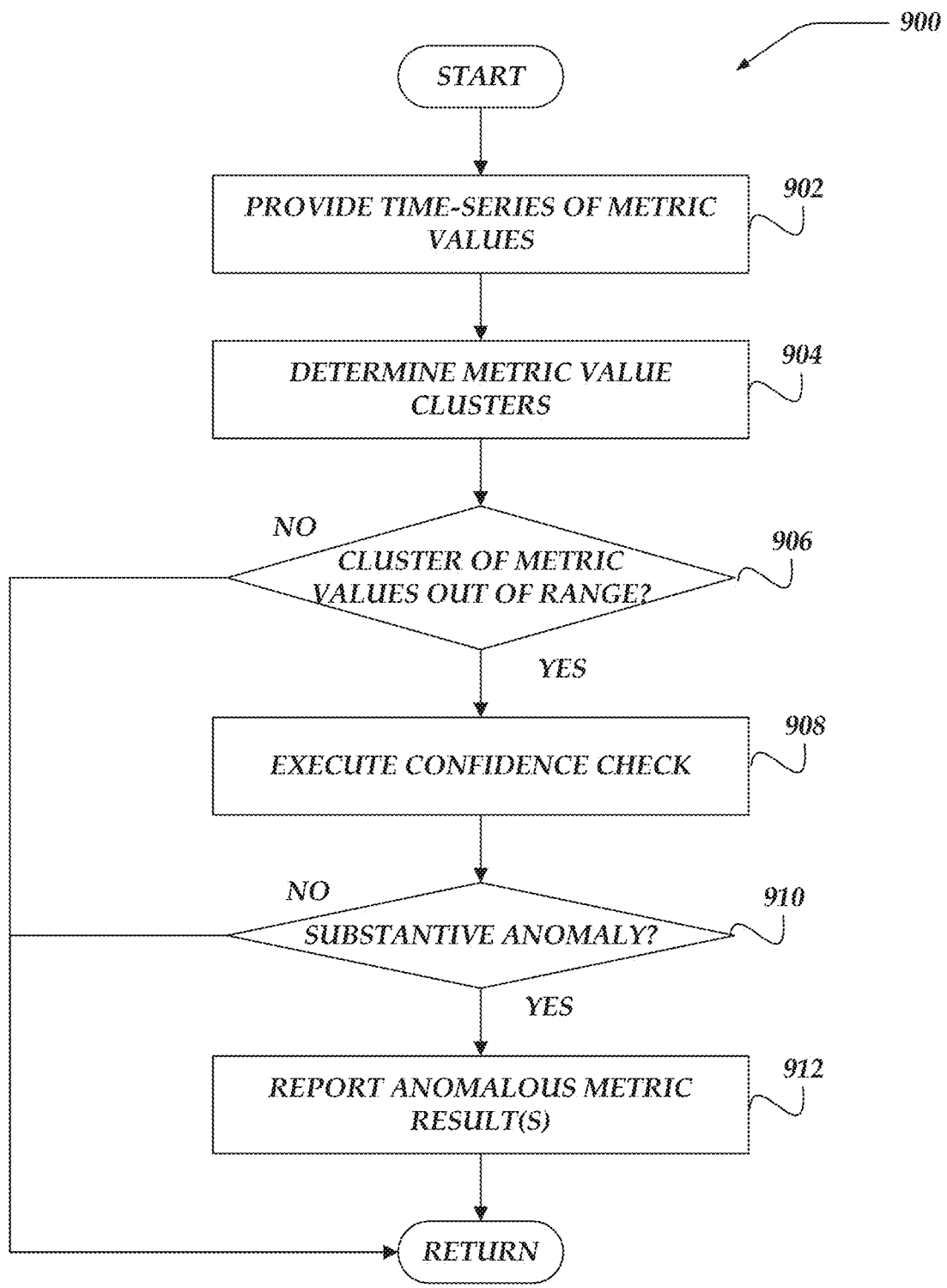
FIG. 9 illustrates a flowchart for a process for automated regression investigator in accordance with one or more of the various embodiments.

FIG. 9 illustrates a flowchart for process 900 for automated regression investigator in accordance with one or more of the various embodiments. After a start block, at block 902, in one or more of the various embodiments, analysis engines may be arranged to be provided a time-series of metric values. As described herein, analysis engines may be arranged to provided time-series of metrics values that may have been generated by one or more test runs executed or managed by a testing engine.

At block 904, in one or more of the various embodiments, analysis engines may be arranged to determine metric values clusters in the time-series. In some embodiments, in some cases, one or more metrics may be inherently variable. Accordingly, in some embodiments, subsequent test runs of even the same service version may result in different values for same metric. In most cases, for some embodiments, this variance of values may be unrelated to differences between service versions or changes across service versions.

In some embodiments, the inherent variance may interfere with identifying meaningful value changes that may be correlated with service version changes. Accordingly, in some embodiments, analysis engines may be arranged to group metric values using clustering methods to divide the time-series of metric values into portions that may be associated substantive changes to metric values. As described above, analysis engines may be configured to employ different clustering methods depending on local requirement or local circumstances. Thus, in some embodiments, analysis engines may be arranged to employ clustering methods based on plugins, extensions, libraries, instructions, rules, or the like, that may be provided via configuration information. For example, in some embodiments, analysis engines may be arranged to employ Jenks natural breaks classification, or the like, to determine cluster boundaries. Accordingly, in some embodiments, boundaries/breaks determined by clustering the metric values may correlate with substantive changes in metric values that may be associated with one or more version changes.

At decision block 906, in one or more of the various embodiments, if the metric value for a cluster of metric values may be outside of a control range, control may flow block 908; otherwise, control may be returned to a calling process.

At block 908, in one or more of the various embodiments, analysis engines may be arranged to execute a confidence check for the determined metric cluster value. In some cases, for some embodiments, particular metric values that are determined to be outside the control range may be spurious because of the inherent variability for some metrics. Accordingly, in some embodiments, analysis engines may be arranged to execute one or more confidence checks. In some embodiments, confidence checks may be heuristics that may be directed to validate if a change in the metric value across two service versions may be consistent or significant enough to merit including it in a defect report, or the like.

In one or more of the various embodiments, confidence checks may be tailored to one or more characteristics of a given metric or service. In some cases, for some embodiments, analysis engines may be arranged to be configured to enable particular confidence checks to selected for particular metrics or services.

In some embodiments, analysis engines may be arranged to select a confidence model that may be arranged (e.g., tuned, trained, or the like) to may be provided one or more inputs such as one or more of a time-series, two or more metric values for different service versions, or the like. Accordingly, in some embodiments, confidence check models may be arranged to execute one or more actions to provide an output value that indicates if the change in metric value may be significant.

At decision block 910, in one or more of the various embodiments, if the out-of-range metric value may be a substantive anomaly, control may flow to block 912; otherwise, control may be returned to a calling process. In some embodiments, if the confidence check confirms that the change in metric values across one or more service versions may be significant, analysis engines may determine that the change in metric values may be a substantive anomaly.

At block 912, in one or more of the various embodiments, analysis engines may be arranged to generate a defect report that includes information associated with the verification actions, the service versions, metric values, or the like.

In some embodiments, analysis engines may be arranged to include information about a particular anomaly to an existing defect report.

Next, in one or more of the various embodiments, control may be returned to a calling process.

Figure 10:
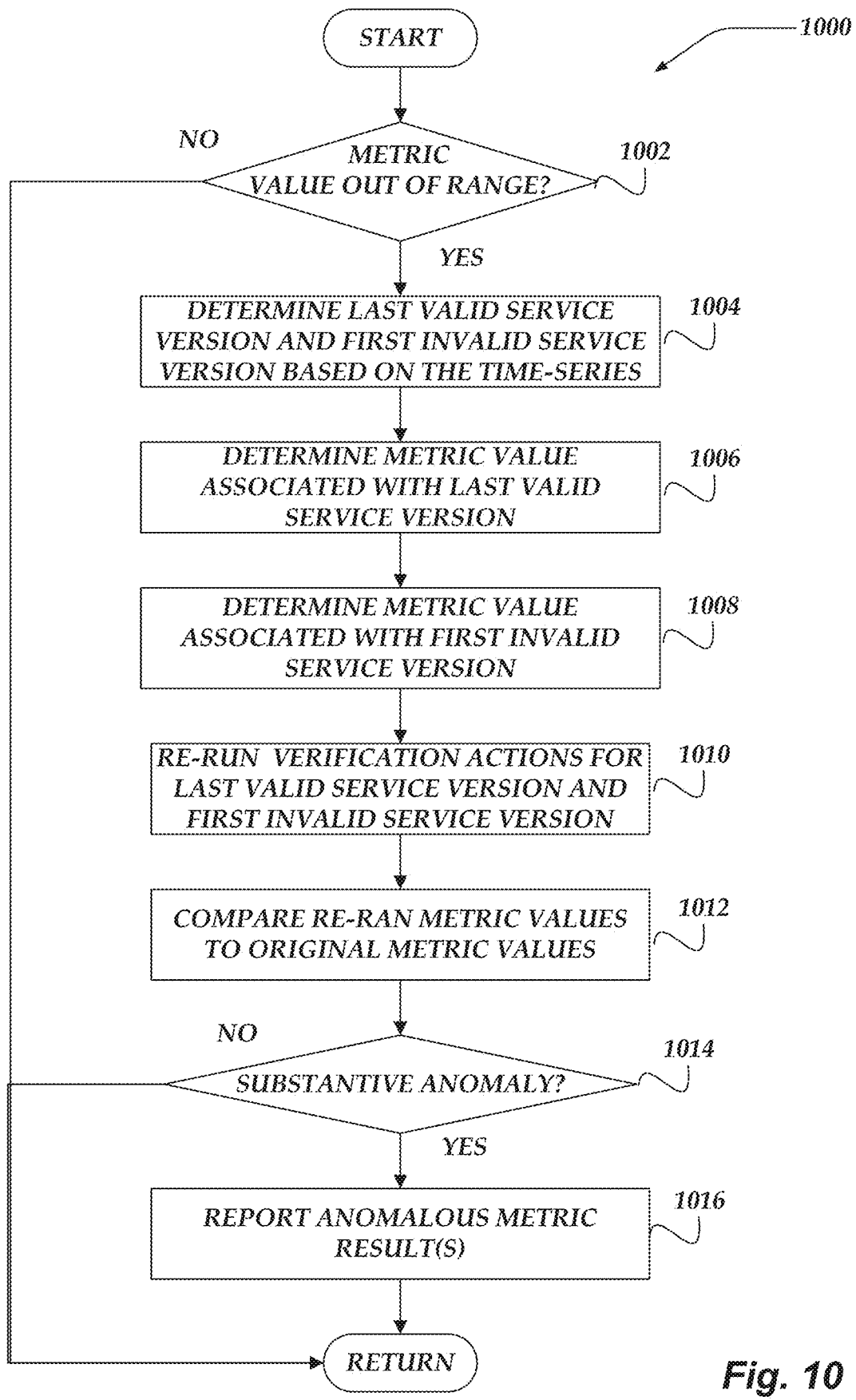
FIG. 10 illustrates a flowchart for a process for performing confidence checks for automated regression investigator in accordance with one or more of the various embodiments.

FIG. 10 illustrates a flowchart for process 1000 for performing confidence checks for automated regression investigator in accordance with one or more of the various embodiments. After a start block, at block 1002, in one or more of the various embodiments, if a metric value may be determined to be outside of a control range, control may flow to block 1004; otherwise, control may be returned to a calling process. As described above, in some embodiments, analysis engines may be arranged to compare metric values in the time-series to its corresponding control range. Thus, in some embodiments, if a metric value may be determined to be outside of its control range, analysis engines may be arranged to perform one or more actions to conduct a confidence check. In some embodiments, confidence checks may be arranged to distinguish substantive variations in metric values from variations that may occur based on the non-determinism that may be inherent for a given metric. For example, in some embodiments, in some cases for some metrics, incidental environmental or changes in non-service related system behavior that occur in a given test run or verification run for a service version may cause a metric value to fall outside of its control range. Accordingly, in some embodiments, analysis engines may be arranged to employ confidence checks to reduce the number of false results that may be reported.

At block 1004, in one or more of the various embodiments, analysis engines may be arranged to determine a last valid server version and a first invalid service version based on the time-series. As described above, in some embodiments, each service version may be associated with one or more changes (e.g., version changes). For example, in some embodiments, as developers work on a server, they may add, modify, or remove, source code to a source code repository. Thus, in some embodiments, if a new service version is generated it may include the changes introduced by developers (or others) since the previous service version was generated. Note, in some embodiments, multiple changes from multiple responsible parties may be collected into a single versions of a service. For example, in some embodiments, if an application builder is configured to automatically generate service versions every 24 hours, the generated service version may include all of the changes that were submitted since the last service version was generated.

In one or more of the various embodiments, source repositories may be expected to include accounting or administrative features the enable changes to be determined. One of ordinary skill in the art will appreciate that source repository applications conventionally provide one or more features, such as, check-in timestamps, tags, labels, timestamps, branches, or the like, that enable particular changes to be determined and included in service branches. Thus, in some embodiments, it may be assumed the correlate particular metric values in the time-series of values with particular service versions.

Accordingly, in some embodiments, analysis engines may be arranged to determine a previous service version that may be associated with the most recent service version where the metric value of interest was within its control range. This service version may be considered the last known valid service version for a metric of interest. Note, different metrics that may be out of range may be associated with different last known valid service versions.

Similarly, in some embodiments, analysis engines may be arranged to determine a first known invalid service version based on determining a first service version in the time-series that corresponds to an out-of-range value for the metric of interest.

In some embodiments, analysis engines may be arranged to employ metric value clustering to determine the last known valid service version and the first known invalid version. Also, in some embodiments, the last known valid service version may be referred to as the last known good service version. And similarly, in some embodiments, the first known invalid service version may be referred to as the first known bad service version.

At block 1006, in one or more of the various embodiments, analysis engines may be arranged to determine a metric value associated with the last valid service version from the time-series of metric values.

At block 1008, in one or more of the various embodiments, analysis engines may be arranged to determine a metric value associated with the first invalid service version from the time-series of metric values.

At block 1010, in one or more of the various embodiments, analysis engines may be arranged to re-run one or more verification actions for the last valid service version and the first invalid service version. In one or more of the various embodiments, re-running the one or more verification actions may generate confidence check values for the metric of interest. In some embodiments, selectively re-running the one or more verification actions for the metric of interest may be advantageous because the time or expense associated with re-running complete verification run may be avoided.

At block 1012, in one or more of the various embodiments, analysis engines may be arranged to compare the re-ran metric values to the original metric values. In some embodiments, analysis engines may be arranged to compare the confidence check values to the metric values associated with the last known valid service version and the first known invalid service version.

At decision block 1014, in one or more of the various embodiments, if the out-of-range metrics may be determined to be a substantive anomaly, control may flow block 1016; otherwise, control may be returned to a calling process.

In one or more of the various embodiments, analysis engines may be arranged to determine a substantive anomaly if the confidence check (the re-ran value) metric value for the last known valid service version remains within the control range and the confidence check (the re-ran value) metric value for the first known invalid service version remains outside the control range. Accordingly, in some embodiments, the confidence check values may not be required to closely match or otherwise be equivalent to the original metric values. Thus, in some embodiments, consideration of the natural variations in metric values may be omitted if the re-ran metric values remain on the 'same-side' of the control range as the time-series of metric values.

In one or more of the various embodiments, analysis engines may be arranged to apply different or additional confidence checks that may be determined via configuration information. Thus, in some embodiments, analysis engines may be modified to include updated confidence check to account for local requirements or local circumstances. For example, in some embodiments, an organization may discover that a first confidence check is insufficient for a particular metric, metric types, or service. Accordingly, for example, the organization may determine another/different confidence check that may be sufficient. Thus, for example, in some embodiments, analysis engines may be updated to employ different/particular confidence checks for particular requirements or circumstances.

At block 1016, in one or more of the various embodiments, analysis engines may be arranged to report the anomalous metric value. In some embodiments, reporting the anomalous metric value may include updating a database, writing log entry, generating a defect report, updating a defect report, updating a data for an interactive graphical user interface dashboard, or the like. In some embodiments, reporting may comprise generating one or more alerts, events, messages, or notifications. In some cases, the one or more alerts, events, messages, or notifications may be provided to another service that may be compile them into reports or forward them to other services.

Next, in one or more of the various embodiments, control may be returned to a calling process.

Figure 11:
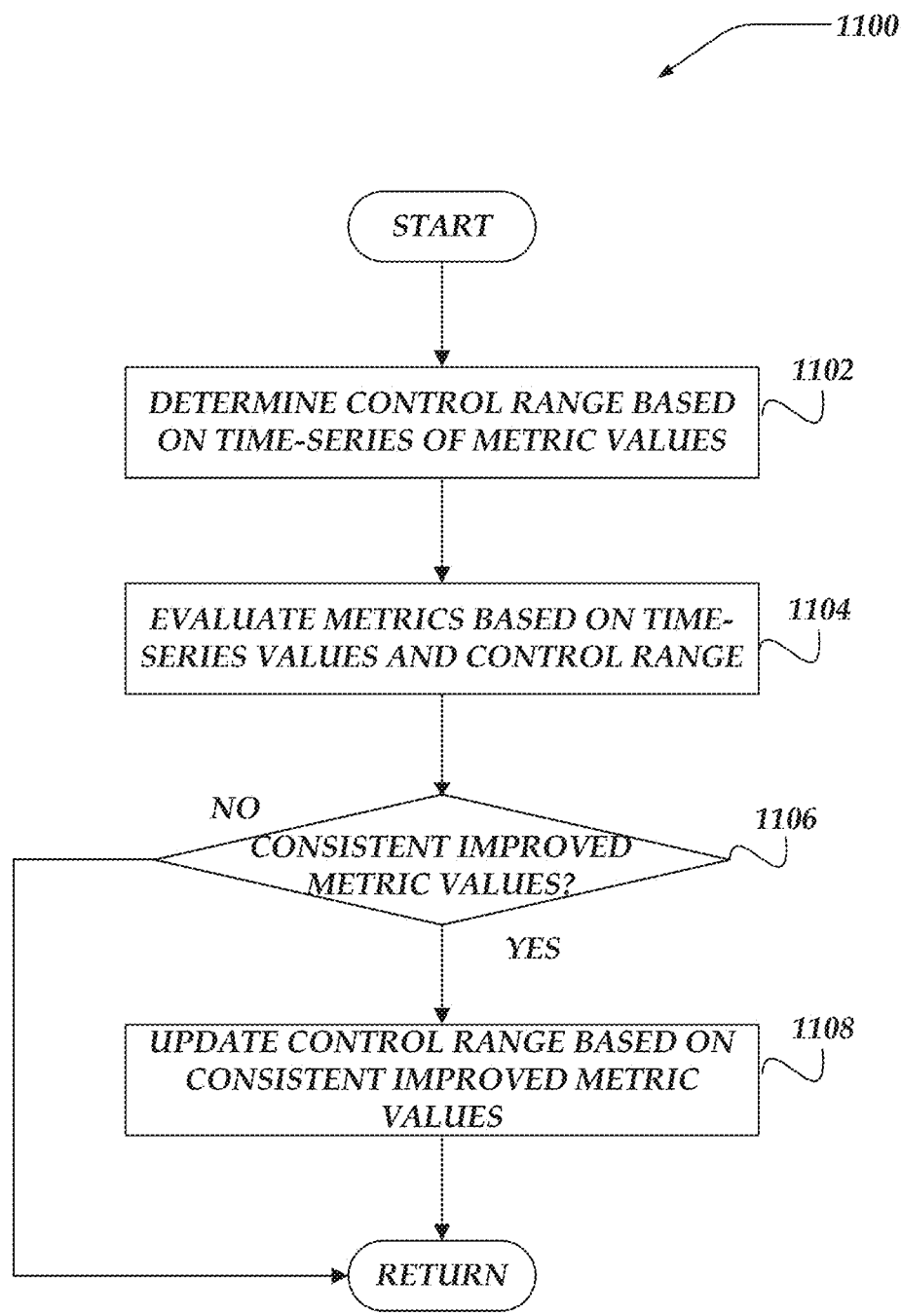
FIG. 11 illustrates a flowchart for a process for automated regression investigator in accordance with one or more of the various embodiments.

FIG. 11 illustrates a flowchart for process 1100 for automated regression investigator in accordance with one or more of the various embodiments. After a start block, at block 1002, in one or more of the various embodiments, analysis engines may be arranged to determine a control range based a time-series of metric values. As described above, in some embodiments, control ranges declare an upper-bound line and a lower-bound line for the value of a metric.

In one or more of the various embodiments, analysis engines may be arranged to determine the control range based on previously collected values for the metric. Accordingly, in some embodiments, analysis engines may be arranged to analyze time-series of values of metrics to determine an initial control range based on the application of one or more statistical method. Accordingly, in some embodiments, analysis engines may be arranged to employ different methods for computing control ranges for different metrics or different services. In some embodiments, analysis engines may be arranged to enable users/administrators to assign one or more methods for determining control ranges to a given metric, or service. For example, in some embodiments, a given metric may produce stable values that enable control ranges to be closely targeted to previous metric values. In contrast, in some cases, a given metric may produce widely variable metric value that require a different method to effectively determine the control range. Also, in some embodiments, analysis engines may be arranged to enable two or more methods to determine two or more control ranges. Thus, in some embodiments, analysis engines may be arranged to compare the effectiveness of different control range determination methods. For example, in some embodiments, if a metric is predicted to follow a normal distribution, a bound lines may be determined based on standard deviation from the mean metric values.

Also, in some embodiments, control ranges may depend on the direction or sense of a given metric. For example, some metrics may be considered to improve as they decrease in value while other metrics may be considered to improve as they increase in value. Thus, in some embodiments, analysis engines may be arranged to adapt control ranges to the direction/sense of a particular metrics.

Also, in one or more of the various embodiments, analysis engines may be arranged to enable one or more filters, or the like, to be applied to the time-series of metric values to exclude one or more outliers that may be included in the time-series of previously collected values.

Also, in some embodiments, control ranges may be determined based on production/performance goals that may be manually established for a given metric.

In some embodiments, analysis engines may be arranged to determine a particular method for determine a control range based on one or more plugins, libraries, instructions, or the like, provided via configuration information to account for local requirements or local circumstances. Accordingly, in some embodiments, if new or additional methods for determining control ranges may be discovered or preferred, analysis engines may be arranged to enable the new or additional methods to be employed.

At block 1104, in one or more of the various embodiments, analysis engines may be arranged to evaluate the metrics based on the time-series of values and the control range. As described above, in some embodiments, analysis engine may be arranged to compare metric values to the control range. In some embodiments, this may include clustering one or more metric values to determine non-spurious anomalous metric values.

At decision block 1106, in one or more of the various embodiments, if consistent improved metric values may be determined, control may flow to decision block 1108; otherwise, control may be returned to a calling process. In some embodiments, analysis engines may be arranged to determine if values for metric may be consistently or regularly showing an improvement based on the values significantly and consistently falling below (or above depending on metric direction/sense) an upper-bound line or a lower-bound line.

In some embodiments, analysis engines may be arranged to employ a statistical method similar to the method employed to set the current control range. For example, if the current range was determined based on the mean and standard deviation of the time-series values, a significant metric improvement may be determined similarly.

In some embodiments, analysis engines may be arranged to compare clustered metric values in the time-series to determine if newer in the time-series values may show improvement over previous clusters of values in the time-series. Accordingly, in some embodiments, if newer portions of the time-series values show an improvement that exceeds a threshold value, the metric may be considered to have shown a consistent and significant improvement. In practice, this type of result may indicate that one or more service features associated with the metric have been improved.

In one or more of the various embodiments, analysis engines may be configured to require a defined number of 'new' time-series values before a significant improvement may be determined. Also, in some embodiments, the preferred number of new time-series values may be configured to have different values for different metrics or different services. Accordingly, in some embodiments, analysis engines may be arranged to select a minimum number of new time-series values based on configuration information to account for local requirements or local circumstances.

At block 1108, in one or more of the various embodiments, analysis engines may be arranged to update the control range based on the improved metric values. As described above, in one or more of the various embodiments, analysis engines may be arranged to employ one or more methods for determining a control range for a metric. Accordingly, in one or more of the various embodiments, analysis engines may be arranged to employ a method for determining control range adjustments that may be similar to determining the original control range.

In some embodiments, analysis engines may be arranged to bisect the time-series of metric values based on where (when) in the time-series that the consistent metric value improvement was determined. Accordingly, in some embodiments, analysis engines may be arranged to employ the time-series values associated with the new value portion of the time-series for determining an updated control range.

Next, in one or more of the various embodiments, control may be returned to a calling process.

Figure 12:
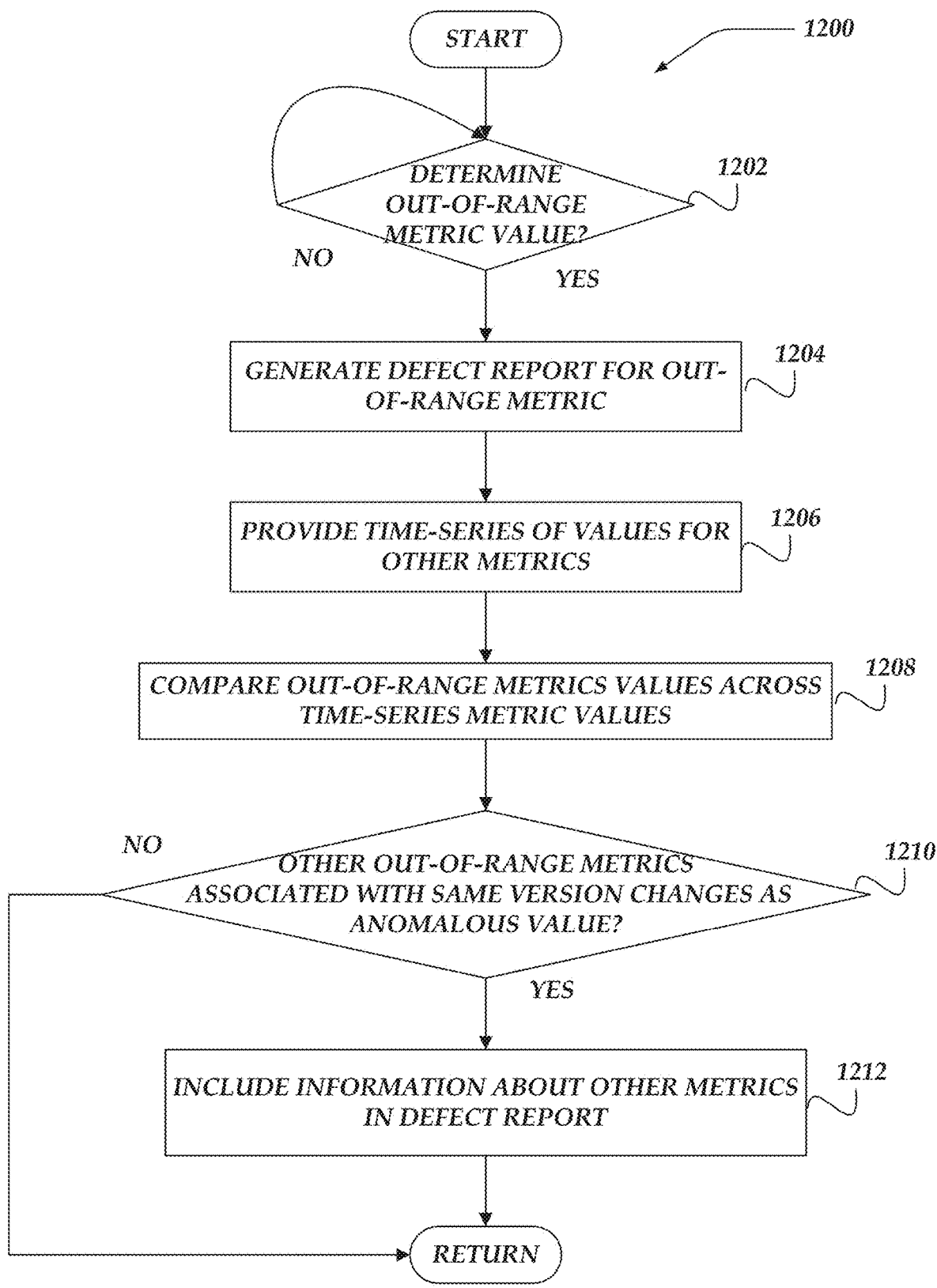
FIG. 12 illustrates a flowchart for a process for automated regression investigator in accordance with one or more of the various embodiments.

FIG. 12 illustrates a flowchart for process 1200 for automated regression investigator in accordance with one or more of the various embodiments. After a start block, at decision block 1202, in one or more of the various embodiments, if an out-of-range metric value may be determined, control may flow to block 1204; otherwise, control may loop back to decision block 1202. As described above, in some embodiments, analysis engines may be arranged to evaluate a time-series of values for a given metric to determine if one or more service changes may be correlated with a degradation in performance or function.

However, in some cases, for some embodiments, the some or all of the service version changes associated with the out-of-range metric value may be correlated with other out-of-range metrics. In some embodiments, testing engines may be arranged to collect values for many metrics. In some cases, testing larger services may produce thousands of metric values for each test run or service version. Accordingly, in some cases, a single service version change may trigger many out-of-range metric values. Thus, in some embodiments, it may be advantageous to collect information about some or all of the out-of-range metrics into a single defect report rather than generating many individual defect reports. For example, for some embodiments, a version change to a low-level component in the service may cause a cascade of issues that result in many metrics having out-of-range values.

At block 1204, in one or more of the various embodiments, analysis engines may be arranged to generate a defect report for the out-of-range metric. In some embodiments, analysis engines may be arranged to create an initial defect report for the out-of-range metric. In some embodiments, the initial defect may be considered a container to collect information associated with the service version changes that may be associated with the out-of-range metric.

At block 1206, in one or more of the various embodiments, analysis engines may be arranged to be provided one or more other time-series of values for one or more other metrics associated with the service. As described above, in some embodiments, testing engines may be arranged to generate time-series of values for some or all of the metrics generated by testing engines.

At block 1208, in one or more of the various embodiments, analysis engines may be arranged to compare the out-of-range metric values across the other time-series metric values.

In one or more of the various embodiments, analysis engines may be arranged to compare metric clusters in different time-series of metric values that may include out-of-range values to determine if they may be correlated with the out-of-range metric being considered. For example, in some embodiments, if the cluster boundaries in the other time-series of with out-of-range values may be similar to the metric under consideration (e.g., the metric determined in decision block 1202), analysis engines may be arranged to determine that service version changes that may be correlated to the initial out-of-range metric value may be correlated with the other metric values.

At decision block 1210, in one or more of the various embodiments, if the comparison determines one or more other metrics that may be associated with out-of-range values and the same or similar service changes as the first metric, control may flow to block 1212; otherwise, control may be returned to a calling process.

At block 1212, in one or more of the various embodiments, analysis engines may be arranged to include information associated with the other out-of-range metrics in the defect report.

In one or more of the various embodiments, analysis engines may be arranged to determine change or defect information associated with the other out-of-range metrics as described above. Accordingly, in some embodiments, rather than generating defect reports for each out-of-range metric, analysis engines may be arranged to bundle information associated with some or all of the out-of-range metrics together. Note, in some embodiments, the information included in the defect report may be limited to out-of-range metrics that may be associated with the same or similar service version changes that may be correlated with the initial out-of-range metric.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Use Cases

FIG. 13 illustrates a representation of defect report 1300 for automated regression investigator in accordance with one or more of the various embodiments. One of ordinary skill in the art will appreciate that defect reports may include more or fewer fields, entries, values, or the like, without departing from the scope of these innovations.

Illustrated Operating Environment

Figure 14:
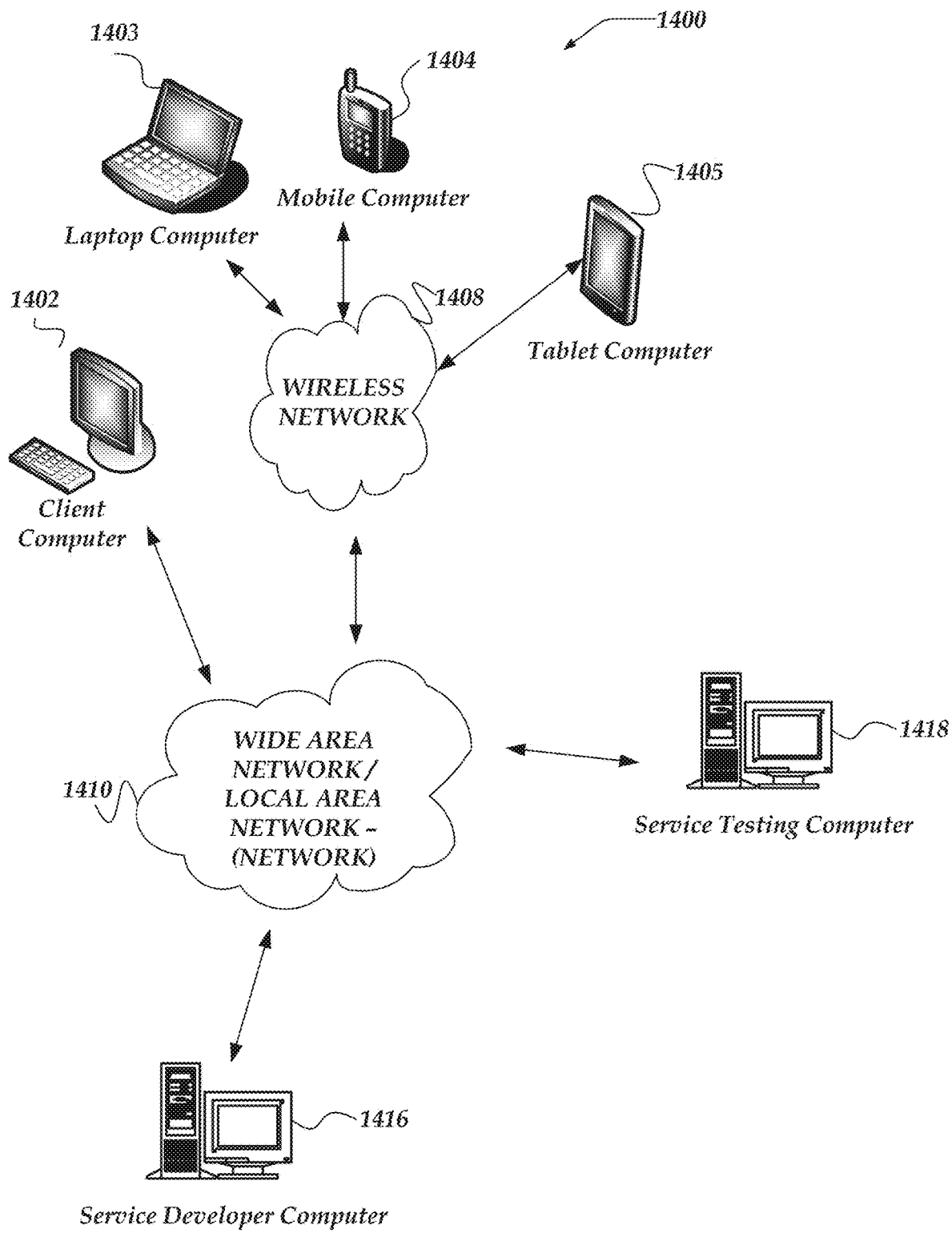
FIG. 14 shows components of one embodiment of an environment in which embodiments of these innovations may be practiced.

FIG. 14 shows components of one embodiment of an environment in which embodiments of these innovations may be practiced. Not all of the components may be required to practice the invention, and variations in the arrangement and type of the components may be made without departing from the spirit or scope of the invention. As shown, system 1400 of FIG. 14 includes local area networks (LANs)/wide area networks (WANs)-(network) 1410, wireless network 1408, client computers 1402-1405, presenter station computer 1416, audience station computer 1418, or the like.

At least one embodiment of client computers 1402-1405 is described in more detail below in conjunction with FIG. 2. In one embodiment, at least some of client computers 1402-1405 may operate over one or more wired or wireless networks, such as networks 1408, or 1410. Generally, client computers 1402-1405 may include virtually any computer capable of communicating over a network to send and receive information, perform various online activities, offline actions, or the like. In one embodiment, one or more of client computers 1402-1405 may be configured to operate within a business or other entity to perform a variety of services for the business or other entity. For example, client computers 1402-1405 may be configured to operate as a web server, firewall, client application, media player, mobile telephone, game console, desktop computer, or the like. However, client computers 1402-1405 are not constrained to these services and may also be employed, for example, as for end-user computing in other embodiments. It should be recognized that more or less client computers (as shown in FIG. 14) may be included within a system such as described herein, and embodiments are therefore not constrained by the number or type of client computers employed.

Computers that may operate as client computer 1402 may include computers that typically connect using a wired or wireless communications medium such as personal computers, multiprocessor systems, microprocessor-based or programmable electronic devices, network PCs, or the like. In some embodiments, client computers 1402-1405 may include virtually any portable computer capable of connecting to another computer and receiving information such as, laptop computer 1403, mobile computer 1404, tablet computers 1405, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 1402-1405 typically range widely in terms of capabilities and features. Moreover, client computers 1402-1405 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 1402-1405 also may include at least one other client application that is configured to receive or send content between another computer. The client application may include a capability to send or receive content, or the like. The client application may further provide information that identifies itself, including a type, capability, name, and the like. In one embodiment, client computers 1402-1405 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, presenter station computer 1416, audience station computer 1418, or other computers.

Client computers 1402-1405 may further be configured to include a client application that enables an end-user to log into an end-user account that may be managed by another computer, such as presenter station computer 1416, audience station computer 1418, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by presenter station computer 1416, audience station computer 1418, or the like.

Wireless network 1408 is configured to couple client computers 1403-1405 and its components with network 1410. Wireless network 1408 may include any of a variety of wireless sub-networks that may further overlay stand-alone ad-hoc networks, and the like, to provide an infrastructure-oriented connection for client computers 1403-1405. Such sub-networks may include mesh networks, Wireless LAN (WLAN) networks, cellular networks, and the like. In one embodiment, the system may include more than one wireless network.

Wireless network 1408 may further include an autonomous system of terminals, gateways, routers, and the like connected by wireless radio links, and the like. These connectors may be configured to move freely and randomly and organize themselves arbitrarily, such that the topology of wireless network 1408 may change rapidly.

Wireless network 1408 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 1403-1405 with various degrees of mobility. In one non-limiting example, wireless network 1408 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 1408 may include virtually any wireless communication mechanism by which information may travel between client computers 1403-1405 and another computer, network, a cloud-based network, a cloud instance, or the like.

Network 1410 is configured to couple network computers with other computers, including, presenter station computer 1416, audience station computer 1418, client computers 1402, and client computers 1403-1405 through wireless network 1408, or the like. Network 1410 is enabled to employ any form of computer readable media for communicating information from one electronic device to another. Also, network 1410 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 1410 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, embodiments of presenter station computer 1416 or audience station computer 1418 is described in more detail below in conjunction with FIG. 15 or FIG. 16. Although FIG. 14 illustrates presenter station computer 1416, audience station computer 1418, or the like, as single computers, the innovations or embodiments are not so limited. For example, one or more functions of presenter station computer 1416, audience station computer 1418, or the like, may be distributed across one or more distinct network computers. Moreover, in one or more embodiments, presenter station computer 1416, audience station computer 1418, may be implemented using a plurality of network computers. Further, in one or more of the various embodiments, presenter station computer 1416, audience station computer 1418, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 15:
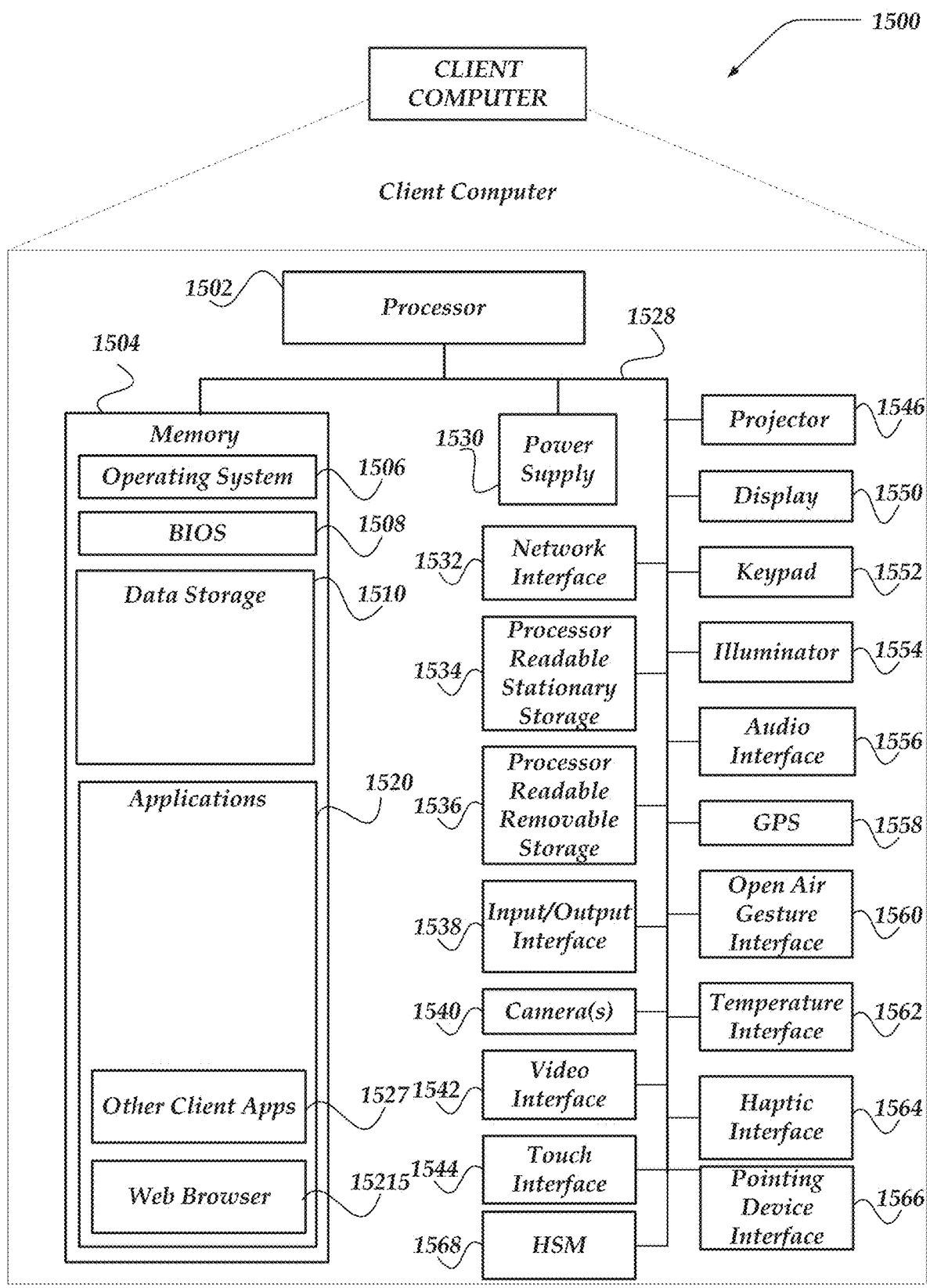
FIG. 15 shows one embodiment of a client computer that may be included in a system implementing one or more of the various embodiments.

FIG. 15 shows one embodiment of client computer 1500 that may include many more or less components than those shown. Client computer 1500 may represent, for example, one or more embodiment of mobile computers or client computers shown in FIG. 14.

Client computer 1500 may include processor 1502 in communication with memory 1504 via bus 1528. Client computer 1500 may also include power supply 1530, network interface 1532, audio interface 1556, display 1550, keypad 1552, illuminator 1554, video interface 1542, input/output interface 1538, haptic interface 1564, global positioning systems (GPS) receiver 1558, open air gesture interface 1560, temperature interface 1562, camera(s) 1540, projector 1546, pointing device interface 1566, processor-readable stationary storage device 1534, and processor-readable removable storage device 1536. Client computer 1500 may optionally communicate with a base station (not shown), or directly with another computer. And in one embodiment, although not shown, a gyroscope may be employed within client computer 1500 to measuring or maintaining an orientation of client computer 1500.

Power supply 1530 may provide power to client computer 1500. A rechargeable or non-rechargeable battery may be used to provide power. The power may also be provided by an external power source, such as an AC adapter or a powered docking cradle that supplements or recharges the battery.

Network interface 1532 includes circuitry for coupling client computer 1500 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1532 is sometimes known as a transceiver, transceiving device, or network interface card (NIC).

Audio interface 1556 may be arranged to produce and receive audio signals such as the sound of a human voice. For example, audio interface 1556 may be coupled to a speaker and microphone (not shown) to enable telecommunication with others or generate an audio acknowledgment for some action. A microphone in audio interface 1556 can also be used for input to or control of client computer 1500, e.g., using voice recognition, detecting touch based on sound, and the like.

Display 1550 may be a liquid crystal display (LCD), gas plasma, electronic ink, light emitting diode (LED), Organic LED (OLED) or any other type of light reflective or light transmissive display that can be used with a computer. Display 1550 may also include a touch interface 1544 arranged to receive input from an object such as a stylus or a digit from a human hand, and may use resistive, capacitive, surface acoustic wave (SAW), infrared, radar, or other technologies to sense touch or gestures.

Projector 1546 may be a remote handheld projector or an integrated projector that is capable of projecting an image on a remote wall or any other reflective object such as a remote screen.

Video interface 1542 may be arranged to capture video images, such as a still photo, a video segment, an infrared video, or the like. For example, video interface 1542 may be coupled to a digital video camera, a web-camera, or the like. Video interface 1542 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1552 may comprise any input device arranged to receive input from a user. For example, keypad 1552 may include a push button numeric dial, or a keyboard. Keypad 1552 may also include command buttons that are associated with selecting and sending images.

Illuminator 1554 may provide a status indication or provide light. Illuminator 1554 may remain active for specific periods of time or in response to event messages. For example, when illuminator 1554 is active, it may back-light the buttons on keypad 1552 and stay on while the client computer is powered. Also, illuminator 1554 may back-light these buttons in various patterns when particular actions are performed, such as dialing another client computer. Illuminator 1554 may also cause light sources positioned within a transparent or translucent case of the client computer to illuminate in response to actions.

Further, client computer 1500 may also comprise hardware security module (HSM) 1568 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1568 may be a stand-alone computer, in other cases, HSM 1568 may be arranged as a hardware card that may be added to a client computer.

Client computer 1500 may also comprise input/output interface 1538 for communicating with external peripheral devices or other computers such as other client computers and network computers. The peripheral devices may include an audio headset, virtual reality headsets, display screen glasses, remote speaker system, remote speaker and microphone system, and the like. Input/output interface 1538 can utilize one or more technologies, such as Universal Serial Bus (USB), Infrared, WiFi, WiMax, Bluetooth™, and the like.

Input/output interface 1538 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 1500.

Haptic interface 1564 may be arranged to provide tactile feedback to a user of the client computer. For example, the haptic interface 1564 may be employed to vibrate client computer 1500 in a particular way when another user of a computer is calling. Temperature interface 1562 may be used to provide a temperature measurement input or a temperature changing output to a user of client computer 1500. Open air gesture interface 1560 may sense physical gestures of a user of client computer 1500, for example, by using single or stereo video cameras, radar, a gyroscopic sensor inside a computer held or worn by the user, or the like. Camera 1540 may be used to track physical motions of a user, such as, hand, finder, or eye movements of a user of client computer 1500.

GPS transceiver 1558 can determine the physical coordinates of client computer 1500 on the surface of the Earth, which typically outputs a location as latitude and longitude values. GPS transceiver 1558 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1500 on the surface of the Earth. It is understood that under different conditions, GPS transceiver 1558 can determine a physical location for client computer 1500. In one or more embodiments, however, client computer 1500 may, through other components, provide other information that may be employed to determine a physical location of the client computer, including for example, a Media Access Control (MAC) address, IP address, and the like.

In at least one of the various embodiments, applications, such as, operating system 1506, other client apps 1527, web browser 1529, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 1558. Also, in some embodiments, geolocation information may include information provided using one or more geolocation protocols over the networks, such as, wireless network 808 or network 810.

Human interface components can be peripheral devices that are physically separate from client computer 1500, allowing for remote input or output to client computer 1500. For example, information routed as described here through human interface components such as display 1550 or keyboard 1552 can instead be routed through network interface 1532 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 1526 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 1504 may include RAM, ROM, or other types of memory. Memory 1504 illustrates an example of computer-readable storage media (devices) for storage of information such as computer-readable instructions, data structures, program modules or other data. Memory 1504 may store BIOS 1508 for controlling low-level operation of client computer 1500. The memory may also store operating system 1506 for controlling the operation of client computer 1500. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 1504 may further include one or more data storage 1510, which can be utilized by client computer 1500 to store, among other things, applications 1520 or other data. For example, data storage 1510 may also be employed to store information that describes various capabilities of client computer 1500. The information may then be provided to another device or computer based on any of a variety of methods, including being sent as part of a header during a communication, sent upon request, or the like. Data storage 1510 may also be employed to store social networking information including address books, buddy lists, aliases, user profile information, or the like. Data storage 1510 may further include program code, data, algorithms, and the like, for use by a processor, such as processor 1502 to execute and perform actions. In one embodiment, at least some of data storage 1510 might also be stored on another component of client computer 1500, including, but not limited to, non-transitory processor-readable removable storage device 1536, processor-readable stationary storage device 1534, or even external to the client computer.

Applications 1520 may include computer executable instructions which, when executed by client computer 1500, transmit, receive, or otherwise process instructions and data. Applications 1520 may include, for example, other client apps 1527, web browser 1529, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 1500 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 1500 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 16:
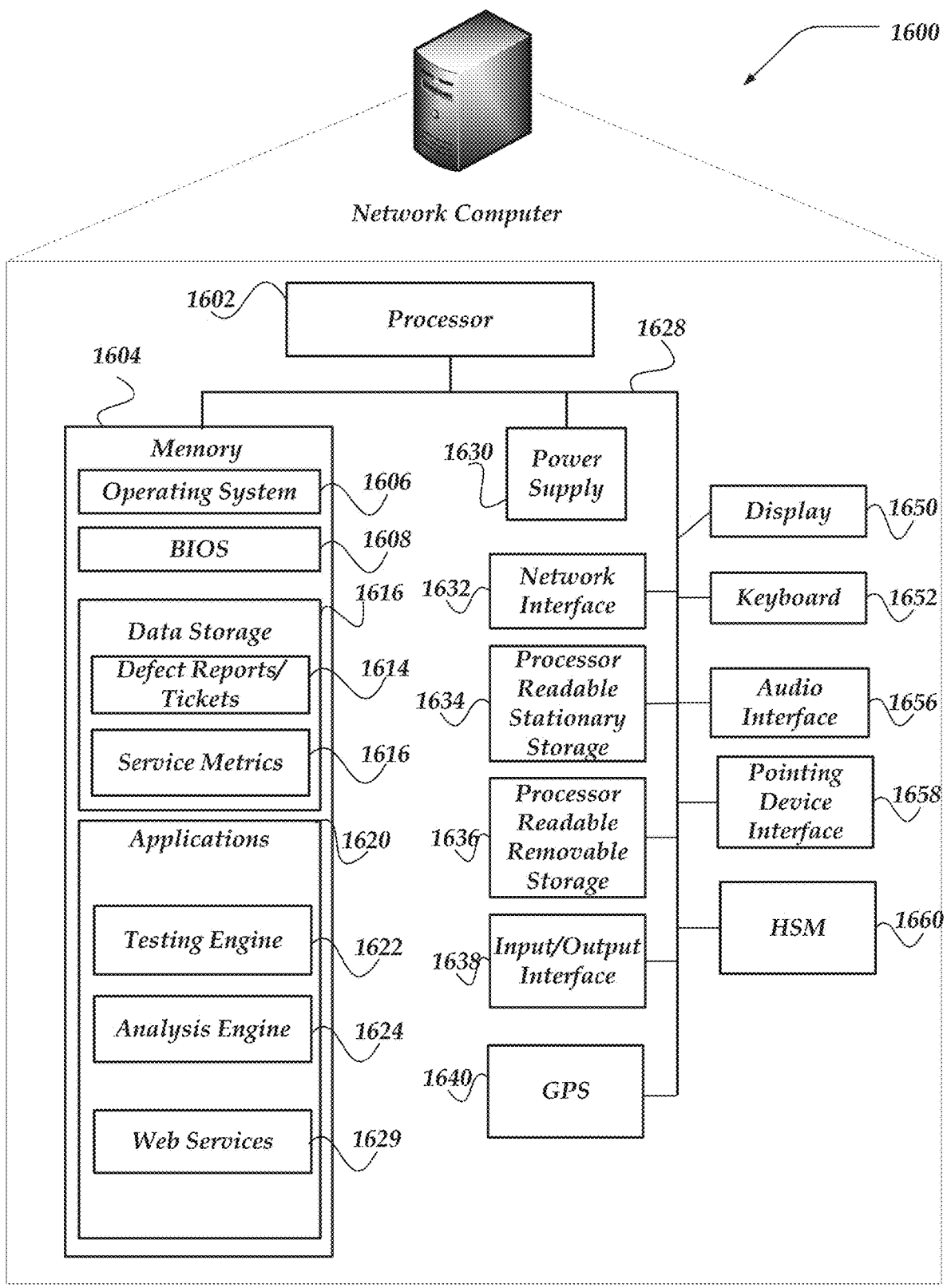
FIG. 16 shows one embodiment of a network computer that may be included in a system implementing one or more of the various embodiments.

FIG. 16 shows one embodiment of network computer 1600 that may be included in a system implementing one or more of the various embodiments. Network computer 1600 may include many more or less components than those shown in FIG. 16. However, the components shown are sufficient to disclose an illustrative embodiment for practicing these innovations.

Network computers, such as, network computer 1600 may include a processor 1602 that may be in communication with a memory 1604 via a bus 1628. In some embodiments, processor 1602 may be comprised of one or more hardware processors, or one or more processor cores. In some cases, one or more of the one or more processors may be specialized processors designed to perform one or more specialized actions, such as, those described herein. Network computer 1600 also includes a power supply 1630, network interface 1632, audio interface 1656, display 1650, keyboard 1652, input/output interface 1638, processor-readable stationary storage device 1634, and processor-readable removable storage device 1636. Power supply 1630 provides power to network computer 1600.

Network interface 1632 includes circuitry for coupling network computer 1600 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 1632 is sometimes known as a transceiver, transceiving device, or network interface card (NIC). Network computer 1600 may optionally communicate with a base station (not shown), or directly with another computer.

Audio interface 1656 is arranged to produce and receive audio signals such as the sound of a human voice. For example, audio interface 1656 may be coupled to a speaker and microphone (not shown) to enable telecommunication with others or generate an audio acknowledgment for some action. A microphone in audio interface 1656 can also be used for input to or control of network computer 1600, for example, using voice recognition.

Display 1650 may be a liquid crystal display (LCD), gas plasma, electronic ink, light emitting diode (LED), Organic LED (OLED) or any other type of light reflective or light transmissive display that can be used with a computer. In some embodiments, display 1650 may be a handheld projector or pico projector capable of projecting an image on a wall or other object.

Network computer 1600 may also comprise input/output interface 1638 for communicating with external devices or computers not shown in FIG. 16. Input/output interface 1638 can utilize one or more wired or wireless communication technologies, such as USB™, Firewire™ WiFi, WiMax, Thunderbolt™, Infrared, Bluetooth™, Zigbee™, serial port, parallel port, and the like.

Also, input/output interface 1638 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 1600. Human interface components can be physically separate from network computer 1600, allowing for remote input or output to network computer 1600. For example, information routed as described here through human interface components such as display 1650 or keyboard 1652 can instead be routed through the network interface 1632 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1658 to receive user input.

GPS transceiver 1640 can determine the physical coordinates of network computer 1600 on the surface of the Earth, which typically outputs a location as latitude and longitude values. GPS transceiver 1640 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1600 on the surface of the Earth. It is understood that under different conditions, GPS transceiver 1640 can determine a physical location for network computer 1600. In one or more embodiments, however, network computer 1600 may, through other components, provide other information that may be employed to determine a physical location of the client computer, including for example, a Media Access Control (MAC) address, IP address, and the like.

In at least one of the various embodiments, applications, such as, operating system 1606, testing engine 1622, analysis engine 1624, web services 1629, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 1640. Also, in some embodiments, geolocation information may include information provided using one or more geolocation protocols over the networks, such as, wireless network 1408 or network 1410.

Memory 1604 may include Random Access Memory (RAM), Read-Only Memory (ROM), or other types of memory. Memory 1604 illustrates an example of computer-readable storage media (devices) for storage of information such as computer-readable instructions, data structures, program modules or other data. Memory 1604 stores a basic input/output system (BIOS) 1608 for controlling low-level operation of network computer 1600. The memory also stores an operating system 1606 for controlling the operation of network computer 1600. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 1604 may further include one or more data storage 1610, which can be utilized by network computer 1600 to store, among other things, applications 1620 or other data. For example, data storage 1610 may also be employed to store information that describes various capabilities of network computer 1600. The information may then be provided to another device or computer based on any of a variety of methods, including being sent as part of a header during a communication, sent upon request, or the like. Data storage 1610 may also be employed to store social networking information including address books, buddy lists, aliases, user profile information, or the like. Data storage 1610 may further include program code, data, algorithms, and the like, for use by a processor, such as processor 1602 to execute and perform actions such as those actions described below. In one embodiment, at least some of data storage 1610 might also be stored on another component of network computer 1600, including, but not limited to, non-transitory media inside processor-readable removable storage device 1636, processor-readable stationary storage device 1634, or any other computer-readable storage device within network computer 1600, or even external to network computer 1600. Data storage 1610 may include, for example, defect reports/tickets 1614, service metrics 1616, or the like.

Applications 1620 may include computer executable instructions which, when executed by network computer 1600, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1620 may include testing engine 1622, analysis engine 1624, web services 1629, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, testing engine 1622, analysis engine 1624, web services 1629, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to testing engine 1622, analysis engine 1624, or the like, may be provisioned and de-commissioned automatically.

Also, in one or more of the various embodiments, test engine 1622, analysis engine 1624, web services 1629, or the like, may be located in virtual servers running in a cloud-based computing environment rather than being tied to one or more specific physical network computers.

Further, network computer 1600 may also comprise hardware security module (HSM) 1660 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1660 may be a stand-alone network computer, in other cases, HSM 1660 may be arranged as a hardware card that may be installed in a network computer.

Additionally, in one or more embodiments (not shown in the figures), network computer 1600 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing services over a network using one or more processors that are configured to execute instructions, wherein the execution of the instructions enables performance of actions, comprising:

providing a time-series of values for a metric associated with an execution of a verification action for a service, wherein each value in the time-series corresponds to a version of the service and the execution of the verification action, and wherein the metric is associated with a control range that declares a range of acceptable values for the metric; and in response to determining a metric value in the time-series of values that is outside of the control range, performing further actions, including:
   determining a last valid version of the service based on the time-series of values and the control range;
   determining a first invalid version of the service based on the time-series of values, the control range and the metric value, wherein the first invalid version of the service is associated with the metric value that is outside of the control range;
   determining one or more changes associated with one or more differences between the last valid version of the service and the first invalid version of the service based on the time-series of values;
   determining one or more responsible parties based on automatically interrogating a source repository for information associated with the one or more determined changes; and
   determining one or more responsible users based on the one or more determined changes; and
   generating a defect report based on the one or more determined changes and the metric value that is outside of the control range, wherein the one or more responsible users and the one or more responsible parties are associated with the defect report.

2. The method of claim 1, further comprising:
determining an upper bound value for the metric value based on the time-series of values;
determining a lower bound value for the metric value based on the time-series of values; and
employing the upper bound value and the lower bound value to determine the control range.

3. The method of claim 1, wherein determining a first invalid version of the service, further comprises:
determining one or more clusters of metric values in the time-series of values based on grouping the time-series of values;
determining one or more cluster boundaries in the time-series or values based on the one or more clusters of metric values; and
determining the first invalid version of the service based on the one or more cluster boundaries associated with the metric value that is outside of the control range.

4. The method of claim 1, wherein determining a last valid version of the service, further comprises:
determining one or more clusters of metric values in the time-series of values based on grouping one or more values in the time-series of values;
determining one or more cluster boundaries in the time-series or values based on the one or more clusters of metric values; and
determining the last valid version of the service based on the one or more cluster boundaries associated with a metric value that is within the control range.

5. The method of claim 1, further comprising:
comparing one or more metric values in the time-series of values with an upper bound of the control range;
in response to the comparison indicating that a sequence of the one or more metric values are less than the upper bound of the control range, performing further actions, including:
   determining a new upper bound based on the sequence of the one or more metric values, wherein the new upper bound is less than the upper bound of the control range;
   modifying the control range to include the new upper bound; and
   employing the modified control range to determine one or more subsequent out-of-range metrics.

6. The method of claim 1, further comprising:
generating a first confidence check value based on the last valid version of the service;
generating a second confidence check value based on the first invalid version of the service; and
in response to the first confidence check value being within the control range and the second confidence check value being outside of the control range, confirming that the metric value in the time-series of values is outside of the control range.

7. The method of claim 1, further comprising:
providing one or more other time-series of other values for one or more other metrics associated with the execution of one or more other verification actions for the service;
comparing the time-series of values for the metric with the one or more other time-series of other values;
determining a portion of the one or more other metrics that are outside of the one or more control ranges based on the comparison; and
including information associated with the portion of the one or more other metrics in the defect report.

8. A system for managing services, comprising:
a network computer, comprising:
   a memory that stores at least instructions; and
   one or more processors that execute instructions that perform actions, including:
      providing a time-series of values for a metric associated with an execution of a verification action for a service, wherein each value in the time-series corresponds to a version of the service and the execution of the verification action, and wherein the metric is associated with a control range that declares a range of acceptable values for the metric; and
      in response to determining a metric value in the time-series of values that is outside of the control range, performing further actions, including:
         determining a last valid version of the service based on the time-series of values and the control range;
         determining a first invalid version of the service based on the time-series of values, the control range and the metric value, wherein the first invalid version of the service is associated with the metric value that is outside of the control range;
         determining one or more changes associated with one or more differences between the last valid version of the service and the first invalid version of the service based on the time-series of values;
         determining one or more responsible parties based on automatically interrogating a source repository for information associated with the one or more determined changes; and determining one or more responsible users based on the one or more determined changes; and generating a defect report based on the one or more determined changes and the metric value that is outside of the control range, wherein the one or more responsible users and the one or more responsible parties are associated with the defect report; and a client computer, comprising:
a memory that stores at least instructions; and
one or more processors that execute instructions that perform actions, including:
displaying the defect report.

9. The system of claim 8, wherein the one or more processors of the network computer execute instructions that perform actions, further comprising:
determining an upper bound value for the metric value based on the time-series of values;
determining a lower bound value for the metric value based on the time-series of values; and
employing the upper bound value and the lower bound value to determine the control range.

10. The system of claim 8, wherein determining a first invalid version of the service, further comprises:
determining one or more clusters of metric values in the time-series of values based on grouping the time-series of values;
determining one or more cluster boundaries in the time-series or values based on the one or more clusters of metric values; and
determining the first invalid version of the service based on the one or more cluster boundaries associated with the metric value that is outside of the control range.

11. The system of claim 8, wherein determining a last valid version of the service, further comprises:
determining one or more clusters of metric values in the time-series of values based on grouping one or more values in the time-series of values;
determining one or more cluster boundaries in the time-series or values based on the one or more clusters of metric values; and
determining the last valid version of the service based on the one or more cluster boundaries associated with a metric value that is within the control range.

12. The system of claim 8, wherein the one or more processors of the network computer execute instructions that perform actions, further comprising:
comparing one or more metric values in the time-series of values with an upper bound of the control range;
in response to the comparison indicating that a sequence of the one or more metric values are less than the upper bound of the control range, performing further actions, including:
determining a new upper bound based on the sequence of the one or more metric values, wherein the new upper bound is less than the upper bound of the control range;
modifying the control range to include the new upper bound; and
employing the modified control range to determine one or more subsequent out-of-range metrics.

13. The system of claim 8, wherein the one or more processors of the network computer execute instructions that perform actions, further comprising:

generating a first confidence check value based on the last valid version of the service;
generating a second confidence check value based on the first invalid version of the service; and
in response to the first confidence check value being within the control range and the second confidence check value being outside of the control range, confirming that the metric value in the time-series of values is outside of the control range.

14. The system of claim 8, wherein the one or more processors of the network computer execute instructions that perform actions, further comprising:
providing one or more other time-series of other values for one or more other metrics associated with the execution of one or more other verification actions for the service;
comparing the time-series of values for the metric with the one or more other time-series of other values;
determining a portion of the one or more other metrics that are outside of the one or more control ranges based on the comparison; and
including information associated with the portion of the one or more other metrics in the defect report.

15. A processor readable non-transitory storage media that includes instructions for managing services over a network, wherein execution of the instructions by one or more processors, performs actions, comprising:
providing a time-series of values for a metric associated with an execution of a verification action for a service, wherein each value in the time-series corresponds to a version of the service and the execution of the verification action, and wherein the metric is associated with a control range that declares a range of acceptable values for the metric; and
in response to determining a metric value in the time-series of values that is outside of the control range, performing further actions, including:
determining a last valid version of the service based on the time-series of values and the control range;
determining a first invalid version of the service based on the time-series of values, the control range and the metric value, wherein the first invalid version of the service is associated with the metric value that is outside of the control range;
determining one or more changes associated with one or more differences between the last valid version of the service and the first invalid version of the service based on the time-series of values;
determining one or more responsible parties based on automatically interrogating a source repository for information associated with the one or more determined changes; and
determining one or more responsible users based on the one or more determined changes; and
generating a defect report based on the one or more determined changes and the metric value that is outside of the control range, wherein the one or more responsible users and the one or more responsible parties are associated with the defect report.

16. The media of claim 15, further comprising:
determining an upper bound value for the metric value based on the time-series of values;
determining a lower bound value for the metric value based on the time-series of values; and
employing the upper bound value and the lower bound value to determine the control range.

17. The media of claim 15, wherein determining a first invalid version of the service, further comprises:
   determining one or more clusters of metric values in the time-series of values based on grouping the time-series of values;
   determining one or more cluster boundaries in the time-series or values based on the one or more clusters of metric values; and
   determining the first invalid version of the service based on the one or more cluster boundaries associated with the metric value that is outside of the control range.

18. The media of claim 15, wherein determining a last valid version of the service, further comprises:
   determining one or more clusters of metric values in the time-series of values based on grouping one or more values in the time-series of values;
   determining one or more cluster boundaries in the time-series or values based on the one or more clusters of metric values; and
   determining the last valid version of the service based on the one or more cluster boundaries associated with a metric value that is within the control range.

19. The media of claim 15, further comprising:
   comparing one or more metric values in the time-series of values with an upper bound of the control range;
   in response to the comparison indicating that a sequence of the one or more metric values are less than the upper bound of the control range, performing further actions, including:
      determining a new upper bound based on the sequence of the one or more metric values, wherein the new upper bound is less than the upper bound of the control range;
      modifying the control range to include the new upper bound; and
      employing the modified control range to determine one or more subsequent out-of-range metrics.

20. The media of claim 15, further comprising:
   generating a first confidence check value based on the last valid version of the service;
   generating a second confidence check value based on the first invalid version of the service; and
   in response to the first confidence check value being within the control range and the second confidence check value being outside of the control range, confirming that the metric value in the time-series of values is outside of the control range.

* * * * *